United States Patent
Jiang

(10) Patent No.: US 11,558,169 B2
(45) Date of Patent: Jan. 17, 2023

(54) DOWNLINK BANDWIDTH PART ADJUSTMENT METHOD, ELECTRONIC DEVICE, AND COMPUTER READABLE STORAGE MEDIUM

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/121,654

(22) Filed: Dec. 14, 2020

(65) Prior Publication Data

US 2021/0099274 A1 Apr. 1, 2021

Related U.S. Application Data

(63) Continuation of application No. PCT/CN2018/093174, filed on Jun. 27, 2018.

(51) Int. Cl.
| | |
|---|---|
| H04L 5/00 | (2006.01) |
| H04L 1/18 | (2006.01) |
| H04W 74/08 | (2009.01) |

(52) U.S. Cl.
CPC ............ *H04L 5/0098* (2013.01); *H04L 1/188* (2013.01); *H04L 5/0092* (2013.01); *H04W 74/0833* (2013.01)

(58) Field of Classification Search
None
See application file for complete search history.

(56) References Cited

U.S. PATENT DOCUMENTS

| | | | | |
|---|---|---|---|---|
| 10,477,457 | B2 * | 11/2019 | Park | H04W 48/12 |
| 10,638,507 | B2 * | 4/2020 | Aiba | H04L 5/0053 |
| 10,855,432 | B2 * | 12/2020 | Aiba | H04W 24/10 |
| 10,863,570 | B2 * | 12/2020 | Cirik | H04W 76/19 |
| 10,945,172 | B2 * | 3/2021 | Jeon | H04W 72/0453 |
| 2002/0114337 | A1 | 8/2002 | Kitamura | |
| 2018/0098361 | A1 | 4/2018 | Ji et al. | |
| 2018/0124687 | A1 * | 5/2018 | Park | H04L 5/1469 |

(Continued)

FOREIGN PATENT DOCUMENTS

| | | |
|---|---|---|
| CN | 102288819 A | 12/2011 |
| CN | 108012329 A | 5/2018 |

(Continued)

OTHER PUBLICATIONS

International Search Report in Application No. PCT/CN2018/093174, dated Mar. 27, 2019.

(Continued)

*Primary Examiner* — Faiyazkhan Ghafoerkhan
(74) *Attorney, Agent, or Firm* — Syncoda LLC; Feng Ma

(57) ABSTRACT

A downlink bandwidth part adjustment method, applicable to user equipment, includes: determining whether at least one timer associated with multiple active downlink bandwidth parts of a current serving cell of the user equipment times out; and if there is at least one timed-out timer among the at least one timer, deactivating each active downlink bandwidth part associated with the timed-out timer, and activating a downlink bandwidth part in a preset state corresponding to the each active downlink bandwidth part.

19 Claims, 17 Drawing Sheets

(56) References Cited

U.S. PATENT DOCUMENTS

| | | | |
|---|---|---|---|
| 2019/0044811 A1* | 2/2019 | Miao | H04L 5/0098 |
| 2019/0103954 A1* | 4/2019 | Lee | H04W 72/042 |
| 2019/0124558 A1* | 4/2019 | Ang | H04L 5/001 |
| 2019/0132109 A1* | 5/2019 | Zhou | H04L 5/001 |
| 2019/0132824 A1* | 5/2019 | Jeon | H04L 5/0092 |
| 2019/0132845 A1* | 5/2019 | Babaei | H04L 5/0098 |
| 2019/0132857 A1* | 5/2019 | Babaei | H04W 72/1273 |
| 2019/0132862 A1* | 5/2019 | Jeon | H04L 5/0064 |
| 2019/0141546 A1* | 5/2019 | Zhou | H04W 72/1294 |
| 2019/0141695 A1* | 5/2019 | Babaei | H04L 5/0057 |
| 2019/0141742 A1* | 5/2019 | Zhou | H04L 5/005 |
| 2019/0149380 A1* | 5/2019 | Babaei | H04W 72/1268 370/330 |
| 2019/0150183 A1* | 5/2019 | Aiba | H04W 48/12 370/336 |
| 2019/0357215 A1* | 11/2019 | Zhou | H04L 5/0094 |
| 2019/0357260 A1* | 11/2019 | Cirik | H04W 72/04 |
| 2019/0357261 A1* | 11/2019 | Cirik | H04W 24/08 |
| 2019/0357262 A1* | 11/2019 | Cirik | H04W 80/02 |
| 2019/0357300 A1* | 11/2019 | Zhou | H04L 5/0098 |
| 2021/0099274 A1* | 4/2021 | Jiang | H04L 5/0092 |
| 2021/0105127 A1* | 4/2021 | Tang | H04L 1/1614 |

FOREIGN PATENT DOCUMENTS

| | | |
|---|---|---|
| CN | 108207032 A | 6/2018 |
| WO | 2018086600 A1 | 5/2018 |

OTHER PUBLICATIONS

3GPP TSG RAN WG1 Meeting 91, Reno, US, Nov. 27-Dec. 2, 2017; Source: Sony, Title: High Level Views on NR-U BWP, R1-1720475, XP051370027.

3GPP TSG RAN2 Meeting #101, Athens, Greece, Feb. 26-Mar. 2, 2018; Source: Huawei, HiSilicon; Title: Remaining issues for BWP inactivity timer, R2-1801816, XP051400052.

3GPP TSG RAN WG1 #90bis, Prague, Czech Republic, Oct. 9-13, 2017; Source: Qualcomm Incorporated, Title: Open Issues on CA, R1-1718581, XP051341761.

Extended European Search Report in Application No. 18923845.4, dated Feb. 1, 2022.

* cited by examiner

DOWNLINK BANDWIDTH PART ADJUSTMENT METHOD, ELECTRONIC DEVICE, AND COMPUTER READABLE STORAGE MEDIUM

CROSS-REFERENCE TO RELATED APPLICATIONS

This application is a Continuation of International Application No. PCT/CN2018/093174 filed on Jun. 27, 2018, the disclosure of which is hereby incorporated by reference in its entirety.

BACKGROUND

In NR (New Radio) technologies, a carrier bandwidth can be divided into multiple bandwidth parts (BWP). When an active downlink BWP is inactive for a period of time, a function of automatically switching back to the default or initial BWP is provided.

SUMMARY

The present disclosure generally relates to communication technologies. Some embodiments of the present disclosure provide a downlink bandwidth part adjustment method, a downlink bandwidth part adjustment device, an electronic device, and a computer-readable storage medium.

According to a first aspect of embodiments of the present disclosure, there is provided a downlink bandwidth part adjustment method, wherein the method is applicable to user equipment and the method includes:

determining whether at least one timer associated with multiple active downlink bandwidth parts of a current serving cell of the user equipment times out; and if there is at least one timed-out timer among the at least one timer, deactivating each active downlink bandwidth part associated with the timed-out timer, and activating a downlink bandwidth part in a preset state corresponding to the each active downlink bandwidth part.

According to some embodiments, deactivating each active downlink bandwidth part associated with the timed-out timer, and activating a downlink bandwidth part in a preset state corresponding to the each active downlink bandwidth part includes:

if the each active downlink bandwidth part associated with the timed-out timer is not the downlink bandwidth part in the preset state, and the downlink bandwidth part in the preset state has been activated, deactivating the each active downlink bandwidth part associated with the timed-out timer.

According to some embodiments, the method further includes:

stopping the timed-out timer.

According to some embodiments, deactivating each active downlink bandwidth part associated with the timed-out timer, and activating a downlink bandwidth part in a preset state corresponding to the each active downlink bandwidth part includes:

if there are multiple active downlink bandwidth parts associated with the timed-out timer, and the multiple active downlink bandwidth parts correspond to a same downlink bandwidth part in the preset state, deactivating the multiple active downlink bandwidth parts, and activating the downlink bandwidth part in the preset state corresponding to the multiple active downlink bandwidth parts.

According to some embodiments, the method further includes:

before determining whether at least one timer associated with multiple active downlink bandwidth parts of a current serving cell of the user equipment times out, determining at least one target downlink bandwidth part among the multiple active downlink bandwidth parts which is configured with a function of automatically falling back to a downlink bandwidth part in a preset state;

wherein determining whether at least one timer associated with multiple active downlink bandwidth parts of a current serving cell of the user equipment times out includes:

determining whether at least one timer associated with the at least one target downlink bandwidth part times out.

According to some embodiments, determining at least one target downlink bandwidth part among the multiple active downlink bandwidth parts which is configured with a function of automatically falling back to a downlink bandwidth part in a preset state includes:

determining whether the current serving cell is configured with the at least one timer, and if the current serving cell is configured with the at least one timer, determining each of the multiple active downlink bandwidth parts as the target downlink bandwidth part.

According to some embodiments, determining at least one target downlink bandwidth part among the multiple active downlink bandwidth parts which is configured with a function of automatically falling back to a downlink bandwidth part in a preset state includes:

determining at least one active downlink bandwidth part among the multiple active downlink bandwidth parts which is configured with a downlink bandwidth part in the preset state as the at least one target downlink bandwidth part.

According to some embodiments, the preset state includes a default state and/or an initial state.

According to some embodiments, deactivating each active downlink bandwidth part associated with the timed-out timer, and activating a downlink bandwidth part in a preset state corresponding to the each active downlink bandwidth part includes:

if the each active downlink bandwidth part associated with the timed-out timer is configured with the downlink bandwidth part in the default state, deactivating the each active downlink bandwidth part associated with the timed-out timer, and activating the downlink bandwidth part in the default state corresponding to the each active downlink bandwidth part associated with the timed-out timer; and if the each active downlink bandwidth part associated with the timed-out timer is not configured with the downlink bandwidth part in the default state, deactivating the each active downlink bandwidth part associated with the timed-out timer, and activating the downlink bandwidth part in the initial state corresponding to the each active downlink bandwidth part associated with the timed-out timer.

According to some embodiments, deactivating each active downlink bandwidth part associated with the timed-out timer, and activating a downlink bandwidth part in a preset state corresponding to the each active downlink bandwidth part further includes:

determining whether the current serving cell is configured with the downlink bandwidth part in the default state, and if the current serving cell is configured with the downlink bandwidth part in the default state, determining that each active downlink bandwidth part associated with the timed-out timer is configured with the downlink bandwidth part in the default state.

According to some embodiments, making the multiple active downlink bandwidth parts fall back to downlink bandwidth parts in the preset state further includes:

determining whether there is a downlink bandwidth part in the default state associated with active downlink bandwidth parts associated with the timed-out timer, and if there is the downlink bandwidth part in the default state, determining that the active downlink bandwidth parts associated with the timed-out timer are configured with the downlink bandwidth part in the default state.

According to some embodiments, the method further includes:

when receiving a deactivation instruction for deactivating at least one of the active downlink bandwidth parts, stopping a timer associated with the at least one of the active downlink bandwidth parts.

According to some embodiments, the method further includes:

when receiving a switching instruction for switching from a first downlink bandwidth part among the multiple active downlink bandwidth parts to a second downlink bandwidth part, stopping a timer associated with the first downlink bandwidth part, and starting or restarting a timer associated with the second downlink bandwidth part.

According to some embodiments, the method further includes:

when the user equipment initiates random access in the current serving cell, stopping one or more timers associated with at least one downlink bandwidth part which participates in the random access among the multiple active downlink bandwidth parts.

According to some embodiments, the method further includes:

if the current serving cell is a non-special cell, stopping one or more timers associated with the at least one downlink bandwidth part which participates in the random access among multiple active downlink bandwidth parts in a special cell.

According to some embodiments, the method further includes:

when the user equipment initiates random access in a first serving cell, and it is determined that the initiated random access is successful according to a received physical downlink control channel instruction in a second cell, starting or restarting one or more timers associated with at least one downlink bandwidth part which participates in the random access among one or more active downlink bandwidth parts in the first cell, and starting or restarting one or more timers associated with at least one downlink bandwidth part which participates in the random access among one or more active downlink bandwidth parts in the second cell.

According to some embodiments, the first cell and the second cell are different cells.

According to some embodiments, the first cell and the second cell are same cells.

According to some embodiments, the method further includes:

if there is a downlink activity in at least one active downlink bandwidth part associated with the timed-out timer, and random access is not performed in the current serving cell, starting or restarting the timed-out timer.

According to some embodiments, the method further includes:

if there is an uplink activity in an uplink bandwidth part of an asymmetric spectrum of the current serving cell, and random access is not performed in the current serving cell, starting a timer associated with a downlink bandwidth part of the asymmetric spectrum.

According to embodiment, the method further includes:

if the user equipment receives an instruction for deactivating a target cell, and the target cell is a non-special cell, stopping one or more timers associated with one or more active downlink bandwidth parts of the non-special cell.

According to a second aspect of embodiments of the present disclosure, there is provided a downlink bandwidth part adjustment device, wherein the device is applicable to user equipment and the device includes:

a time-out determination module configured to determine whether at least one timer associated with multiple active downlink bandwidth parts of a current serving cell of the user equipment times out; and an activation control module configured to, if there is at least one timed-out timer among the at least one timer, deactivate each active downlink bandwidth part associated with the timed-out timer, and activate a downlink bandwidth part in a preset state corresponding to the each active downlink bandwidth part.

According to some embodiments, the activation control module is configured to:

if the each active downlink bandwidth part associated with the timed-out timer is not the downlink bandwidth part in the preset state, and the downlink bandwidth part in the preset state has been activated, deactivate the each active downlink bandwidth part associated with the timed-out timer.

According to some embodiments, the device further includes:

a first stop module configured to stop the timed-out timer.

According to some embodiments, the activation control module is configured so that:

if there are multiple active downlink bandwidth parts associated with the timed-out timer, and the multiple active downlink bandwidth parts correspond to a same downlink bandwidth part in the preset state, deactivate the multiple active downlink bandwidth parts, and activating the downlink bandwidth part in the preset state corresponding to the multiple active downlink bandwidth parts.

According to some embodiments, the device further includes:

a configuration determination module configured to, before whether at least one timer associated with multiple active downlink bandwidth parts of a current serving cell of the user equipment times out is determined, determine at least one target downlink bandwidth part among the multiple active downlink bandwidth parts which is configured with a function of automatically falling back to a downlink bandwidth part in a preset state;

wherein the time-out determination module is configured to:

determine whether at least one timer associated with the at least one target downlink bandwidth part times out.

According to some embodiments, the configuration determination module is configured to:

determine whether the current serving cell is configured with the at least one timer, and if the current serving cell is configured with the at least one timer, determining each of the multiple active downlink bandwidth parts as the target downlink bandwidth part.

According to some embodiments, the configuration determination module is configured to:

determine at least one active downlink bandwidth part among the multiple active downlink bandwidth parts which is configured with a downlink bandwidth part in the preset state as the at least one target downlink bandwidth part.

According to some embodiments, the preset state includes a default state and/or an initial state.

According to some embodiments, the activation control module includes:

an activation selection submodule configured to, if the each active downlink bandwidth part associated with the timed-out timer is configured with the downlink bandwidth part in the default state, deactivate the each active downlink bandwidth part associated with the timed-out timer, and activate the downlink bandwidth part in the default state corresponding to the each active downlink bandwidth part associated with the timed-out timer; and if the each active downlink bandwidth part associated with the timed-out timer is not configured with the downlink bandwidth part in the default state, deactivate the each active downlink bandwidth part associated with the timed-out timer, and activate the downlink bandwidth part in the initial state corresponding to the each active downlink bandwidth part associated with the timed-out timer.

According to some embodiments, the activation control module further includes:

a first determination submodule configured to determine whether the current serving cell is configured with the downlink bandwidth part in the default state, and if the current serving cell is configured with the downlink bandwidth part in the default state, determine that each active downlink bandwidth part associated with the timed-out timer is configured with the downlink bandwidth part in the default state.

According to some embodiments, the activation control module further includes:

a second determination submodule configured to determine whether there is a downlink bandwidth part in the default state associated with active downlink bandwidth parts associated with the timed-out timer, and if there is the downlink bandwidth part in the default state, determine that the active downlink bandwidth parts associated with the timed-out timer are configured with the downlink bandwidth part in the default state.

According to some embodiments, the device further includes:

a second stop module configured to, when a deactivation instruction for deactivating at least one of the active downlink bandwidth parts is received, stop a timer associated with the at least one of the active downlink bandwidth parts.

According to some embodiments, the device further includes:

a timer control module configured to, when a switching instruction for switching from a first downlink bandwidth part among the multiple active downlink bandwidth parts to a second downlink bandwidth part is received, stop a timer associated with the first downlink bandwidth part, and start or restart a timer associated with the second downlink bandwidth part.

According to some embodiments, the device further includes:

a third stop module configured to, when the user equipment initiates random access in the current serving cell, stop one or more timers associated with at least one downlink bandwidth part which participates in the random access among the multiple active downlink bandwidth parts.

According to some embodiments, the third stop module is further configured to:

if the current serving cell is a non-special cell, stop one or more timers associated with the at least one downlink bandwidth part which participates in the random access among multiple active downlink bandwidth parts in a special cell.

According to some embodiments, the device further includes:

a first start module configured to, when the user equipment initiates random access in a first serving cell, and it is determined that the initiated random access is successful according to a received physical downlink control channel instruction in a second cell, start or restart one or more timers associated with at least one downlink bandwidth part which participates in the random access among one or more active downlink bandwidth parts in the first cell, and start or restart one or more timers associated with at least one downlink bandwidth part which participates in the random access among one or more active downlink bandwidth parts in the second cell.

According to some embodiments, the first cell and the second cell are different cells.

According to some other embodiments, the first cell and the second cell are a same cell.

According to some embodiments, the device further includes:

a second start module configured to, if there is a downlink activity in at least one active downlink bandwidth part associated with the timed-out timer, and random access is not performed in the current serving cell, start or restart the timed-out timer.

According to some embodiments, the device further includes:

a third start module configured to, if there is an uplink activity in an uplink bandwidth part of an asymmetric spectrum of the current serving cell, and random access is not performed in the current serving cell, start a timer associated with a downlink bandwidth part of the asymmetric spectrum.

According to some embodiments, the device further includes:

a fourth stop module configured to, if the user equipment receives an instruction for deactivating a target cell, and the target cell is a non-special cell, stop one or more timers associated with one or more active downlink bandwidth parts of the non-special cell.

According a third aspect of embodiments of the present disclosure, there is provided an electronic device, including:

a processor; and memory configured to store instructions executable by the processor;

wherein the processor is configured to perform the method according to any one of the above embodiments.

According to a fourth aspect of embodiments of the present disclosure, there is provided a computer-readable storage medium having computer programs stored thereon, wherein when the computer programs are executed by a processor, the processor is caused to perform steps in the any one of the above embodiments.

BRIEF DESCRIPTION OF THE DRAWINGS

In order to more clearly describe the technical solutions in embodiments of the present disclosure, the following will briefly introduce the drawings in the description of the embodiments. The drawings show only some embodiments of the present disclosure, and for those of ordinary skill in the art, other drawings can be obtained from these drawings.

DETAILED DESCRIPTION

The following will clearly and completely describe the technical solutions in some embodiments of the present disclosure with reference to drawings. The described embodiments are only a part of embodiments of the present disclosure, and not all of the embodiments. Based on the embodiments described herein, all other embodiments obtained by those of ordinary skill in the art without creative work shall fall within the protection scope of the present disclosure.

A BWP inactivity timer can be set to record the duration of inactivity of the active downlink BWP. However, this fallback function for the active downlink BWP typically is only applicable to the case where there is one active downlink BWP in a cell, which is not conducive to the expansion of application scenarios.

Figure 1:
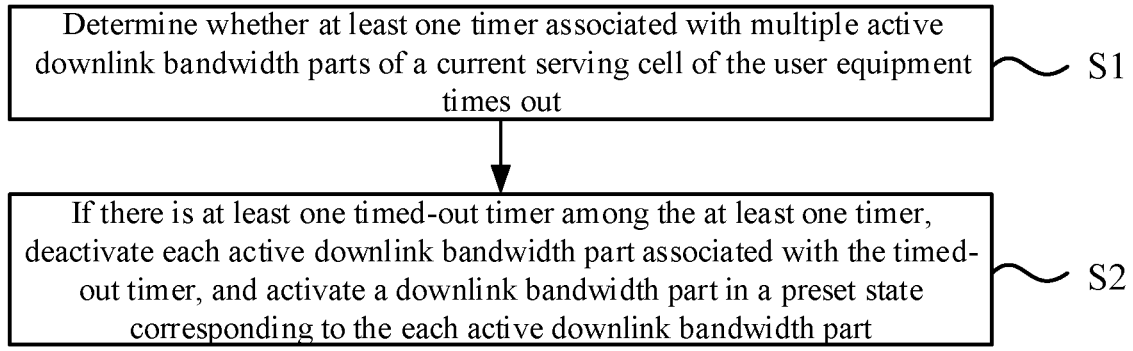
FIG. 1 is a first schematic flowchart of a downlink bandwidth part adjustment method according to an embodiment of the present disclosure.

FIG. 1 is a schematic flowchart of a downlink bandwidth part adjustment according to an embodiment of the present disclosure. The downlink bandwidth part adjustment method shown in this embodiment can be applied to user equipment, such as an electronic device like mobile phone or tablet computer. The user equipment may communicate with a base station, and the base station may be, for example, a 4G or 5G base station, or the like.

As shown in FIG. 1, the downlink bandwidth part adjustment method may include the following steps:

In step S1, whether at least one timer associated with multiple active downlink bandwidth parts of a current serving cell of the user equipment times out is determined.

In step S2, if there is at least one timed-out timer among the at least one timer, each active downlink bandwidth part associated with the timed-out timer is deactivated, and a downlink bandwidth part in a preset state corresponding to the each active downlink bandwidth part is activated.

In an embodiment, multiple active downlink bandwidth parts can be configured for the serving cell, and each active downlink bandwidth part is associated with a timer. The timer may be an inactivity timer for a bandwidth part. There may be a case where multiple active downlink bandwidth parts are associated with the same timer, or there may also be a case where multiple active downlink bandwidth parts are associated with different timers respectively, or the two cases may exist at the same time.

In an embodiment, the preset state can be a default state or an initial state. The default state can be configured by the base station. For different active downlink bandwidth parts, different default states can be configured, or the same default state can be configured. The initial state can also be configured by the base station, and the same configuration is performed for all user equipment. The difference between the initial state and the default state is that a downlink bandwidth part in the initial state is applicable to all user equipment, while a downlink bandwidth part in the default state is only applicable to some user equipment. Therefore, as compared with downlink bandwidth parts in the default state, more user equipment uses the downlink bandwidth parts in the initial state, and thus congestion is more serious.

In an embodiment, an active downlink bandwidth part used by the user equipment in the current cell may be inactive for a long time. In this case, the active downlink bandwidth part needs to be deactivated, that is, it is needed to set the downlink bandwidth part in an inactive state. The inactivity time period of the active downlink bandwidth part can be recorded by a timer. In the case of the timer timeout, it can be determined that the inactivity time period of the active downlink bandwidth part is greater than a preset time period. Therefore, it is needed to deactivate the active downlink bandwidth part, and to activate a downlink bandwidth part in the preset state corresponding to the active downlink bandwidth part, for use by the user equipment.

According to the embodiments of the present disclosure, each active downlink bandwidth part is associated with a timer, and thus time can be calculated separately for each active downlink bandwidth part by the timer. For example, the timer can be used to record the inactivity time period of each active downlink bandwidth part. When there is a timer that has timed out, that is, among one or more active downlink bandwidth parts for which the timer is used to record the inactivity time periods, the inactivity time period of at least one active downlink bandwidth part is greater than a preset time period, the active downlink bandwidth part(s) associated with the timed-out timer can be switched back to downlink bandwidth part(s) in a preset state. That is, the active downlink bandwidth part(s) associated with the timed-out timer is(are) deactivated, and the downlink bandwidth part(s) in the preset state corresponding to the active downlink bandwidth part(s) associated with the timed-out timer is(are) activated.

Accordingly, multiple active downlink bandwidth parts can be configured for a serving cell, ensuring that the serving cell can be applied to a wider range of application scenarios. By associating each active downlink bandwidth part with a respective timer, time can be calculated for each active downlink bandwidth part. This can ensure that once an active downlink bandwidth part is inactive for a period longer than a preset time period, it can be determined that the timer runs out, and the active downlink bandwidth part is switched back to a downlink bandwidth part in the preset state. Some embodiments of the present disclosure can avoid the situation that when the active downlink bandwidth part is inactive for a period longer than the preset time period, the timer is not determined as timed-out. Thus, embodiments of the present disclosure can ensure that user equipment can communicate normally by the serving cell configured with multiple active downlink bandwidth parts.

Figure 2:
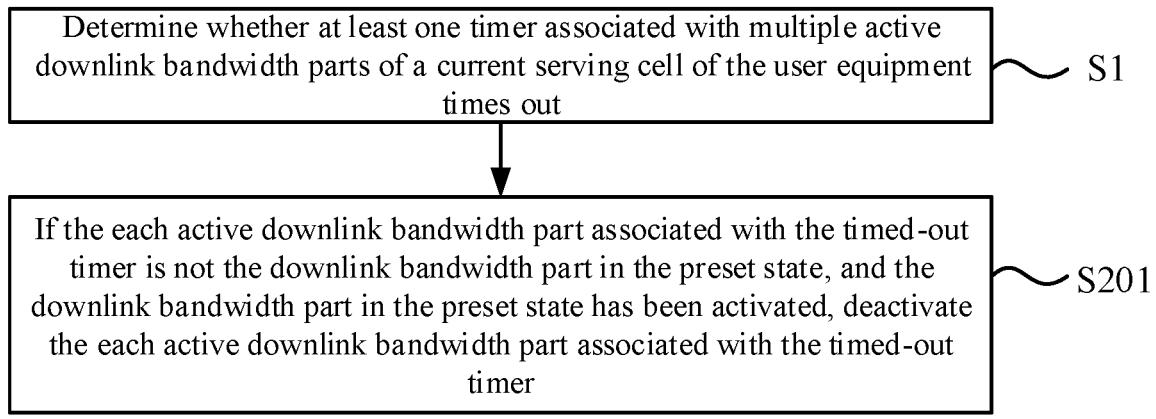
FIG. 2 is a second schematic flowchart of a downlink bandwidth part adjustment method according to some other embodiments of the present disclosure.

FIG. 2 is a schematic flowchart of a downlink bandwidth part adjustment method according to some other embodiments of the present disclosure. As shown in FIG. 2, on the basis of the embodiment shown in FIG. 1, deactivating each active downlink bandwidth part associated with the timed-out timer, and activating a downlink bandwidth part in a preset state corresponding to the each active downlink bandwidth part includes:

In step S201, if the each active downlink bandwidth part associated with the timed-out timer is not the downlink bandwidth part in the preset state, and the downlink bandwidth part in the preset state has been activated, the each active downlink bandwidth part associated with the timed-out timer is deactivated.

In an embodiment, when the timer times out, the active downlink bandwidth part associated with the timer needs to be deactivated, and the downlink bandwidth part in the preset state corresponding to the active downlink bandwidth part needs to be activated.

However, in some cases, for example, multiple active downlink bandwidth parts correspond to the same downlink bandwidth part in the preset state, the following situation may occur. For example, an active downlink bandwidth part A and an active downlink bandwidth part B correspond to the same downlink bandwidth part C in the preset state. When the timer corresponding to the active downlink bandwidth part A times out, the user equipment deactivates the active downlink bandwidth part A, and activates the downlink bandwidth part C in the preset state corresponding to the active downlink bandwidth part A. Then, when the timer corresponding to the active downlink bandwidth part B times out, the downlink bandwidth part C in the preset state corresponding to the active downlink bandwidth part B has already been activated, that is, the user equipment is performing communications using the active downlink bandwidth part C of the present state. Under such condition, for the active downlink bandwidth part B corresponding to the timed-out timer, there is no downlink bandwidth part in the preset state that needs to be activated.

In this case, it is only needed to deactivate each active downlink bandwidth part associated with the timed-out timer, so as to avoid keeping the active state of the active downlink bandwidth part that is inactive for a long time.

Figure 3:
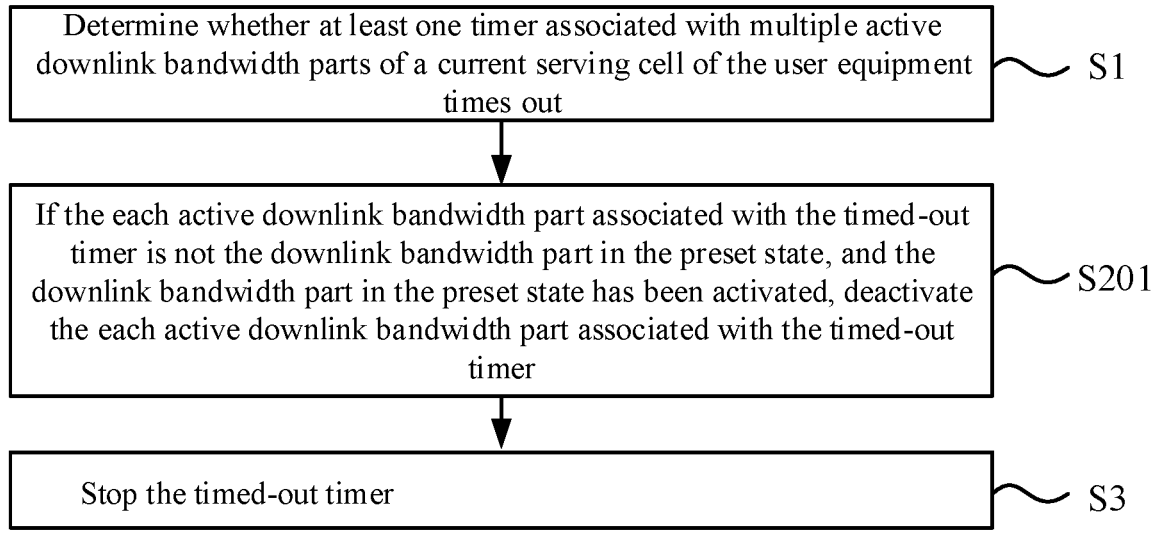
FIG. 3 is a third schematic flowchart of a downlink bandwidth part adjustment method according to some other embodiments of the present disclosure.

FIG. 3 is a schematic flowchart of a downlink bandwidth part adjustment method according to some other embodiments of the present disclosure. As shown in FIG. 3, on the basis of the embodiment shown in FIG. 2, the method further includes the following step:

In step S3, the timed-out timer is stopped.

In an embodiment, after deactivating the active downlink bandwidth part(s) associated with the timed-out timer, the deactivated downlink bandwidth part(s) is(are) in the inactive state and will not be active, and thus there is no need for the timer to continue to record the duration of its inactivity. Accordingly, the expired timer can be stopped to reduce the operating load of the user equipment.

Figure 4:
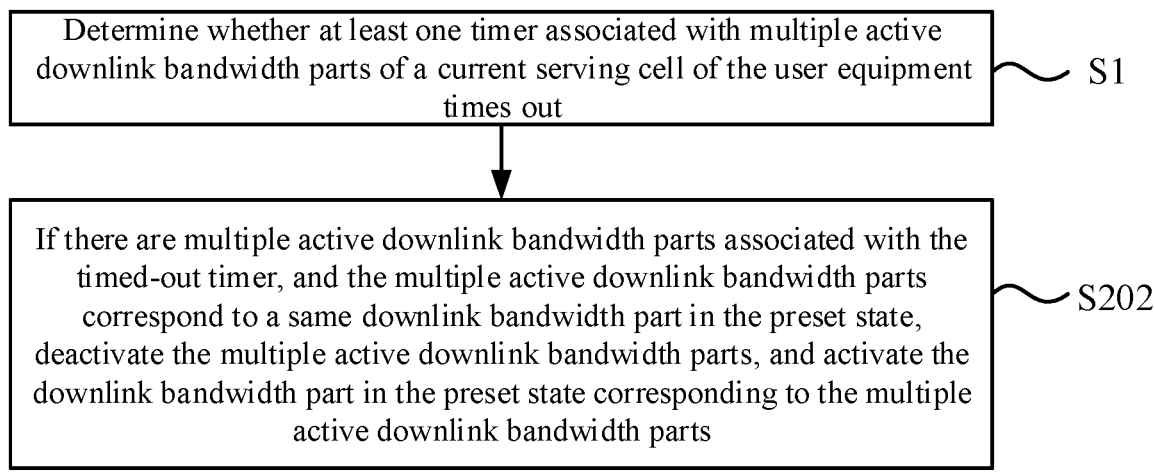
FIG. 4 is a fourth schematic flowchart of a downlink bandwidth part adjustment method according to some other embodiments of the present disclosure.

FIG. 4 is a schematic flowchart of a downlink bandwidth part adjustment method according to some other embodiments of the present disclosure. As shown in FIG. 4, on the basis of the embodiment shown in FIG. 1, deactivating each active downlink bandwidth part associated with the timed-out timer, and activating a downlink bandwidth part in a preset state corresponding to the each active downlink bandwidth part includes:

In step S202, if there are multiple active downlink bandwidth parts associated with the timed-out timer, and the multiple active downlink bandwidth parts correspond to a same downlink bandwidth part in the preset state, the multiple active downlink bandwidth parts are deactivated, and the downlink bandwidth part in the preset state corresponding to the multiple active downlink bandwidth parts is activated.

In an embodiment, if the multiple active downlink bandwidth parts associated with the timer correspond to the same downlink bandwidth part in the preset state, it is needed to activate the downlink bandwidth part in the preset state corresponding to the multiple active downlink bandwidth parts and deactivate the multiple active downlink bandwidth parts, when the timer times out. In this way, the embodiment can make the active downlink bandwidth parts that are inactive for a long time in the inactive state, and the downlink bandwidth part in the preset state becomes active for use by the user equipment.

Figure 5:
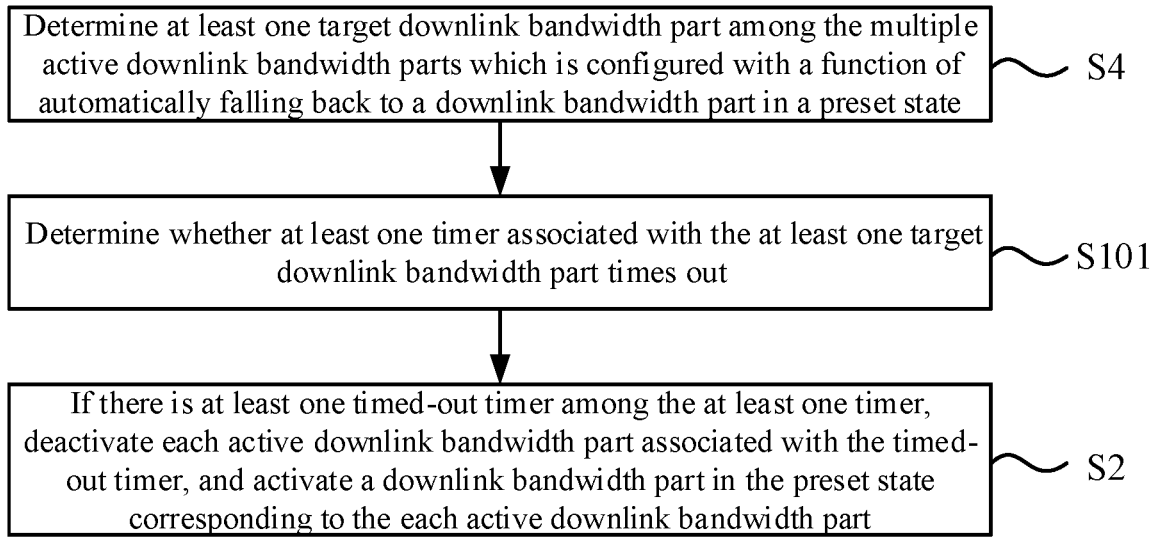
FIG. 5 is a fifth schematic flowchart of a downlink bandwidth part adjustment method according to some other embodiments of the present disclosure.

FIG. 5 is a schematic flowchart of a downlink bandwidth part adjustment method according to some other embodiments of the present disclosure. As shown in FIG. 5, on the basis of the embodiment shown in FIG. 1, the method further includes:

In step S4, before determining whether at least one timer associated with multiple active downlink bandwidth parts of a current serving cell of the user equipment times out, at least one target downlink bandwidth part among the multiple active downlink bandwidth parts which is configured with a function of automatically falling back to a downlink bandwidth part in a preset state is determined.

Determining whether at least one timer associated with multiple active downlink bandwidth parts of a current serving cell of the user equipment times out includes the following step:

In step S101, whether at least one timer associated with the at least one target downlink bandwidth part times out is determined.

In an embodiment, the base station can configure a function of automatically falling back to a downlink bandwidth part in the preset state for the active downlink bandwidth part(s) of the serving cell. When an active downlink bandwidth part of the serving cell is configured with the function, an associated timer can be configured for the active downlink bandwidth part to record its inactivity duration.

Therefore, before determining whether at least one timer associated with multiple active downlink bandwidth parts of the current serving cell of the user equipment times out, at least one target downlink bandwidth part among the multiple active downlink bandwidth parts which is configured with a function of automatically falling back to a downlink bandwidth part in a preset state may be first determined. Since only the target downlink bandwidth part among the multiple active downlink bandwidth parts is associated with a timer, it is possible to determine whether the timer has expired only for the target downlink bandwidth part, and there is no need to consider other downlink bandwidth parts among the multiple active downlink bandwidth parts, thereby reducing workload.

Figure 6:
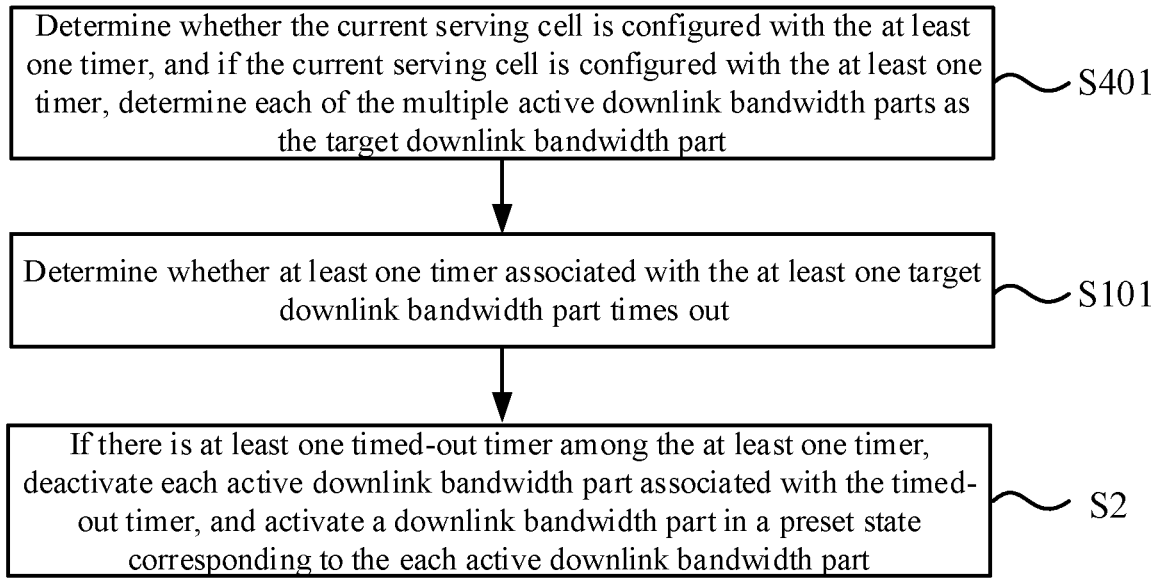
FIG. 6 is a sixth schematic flowchart of a downlink bandwidth part adjustment method according to some other embodiments of the present disclosure.

FIG. 6 is a schematic flowchart of a downlink bandwidth part adjustment method according to some other embodiments of the present disclosure. As shown in FIG. 6, on the basis of the embodiment shown in FIG. 5, determining at least one target downlink bandwidth part among the multiple active downlink bandwidth parts which is configured with a function of automatically falling back to a downlink bandwidth part in a preset state includes the following step:

In step S401, whether the current serving cell is configured with the at least one timer is determined, and if the current serving cell is configured with the at least one timer, each of the multiple active downlink bandwidth parts is determined as the target downlink bandwidth part.

In an embodiment, the base station can configure a timer for a cell. When the user equipment determines that the current serving cell of the user equipment is configured with the timer, it can be determined that all active downlink bandwidth parts of the current serving cell are configured with the above function, and thus all the active downlink bandwidth parts of the current serving cell can be used as the target downlink bandwidth parts.

Figure 7:
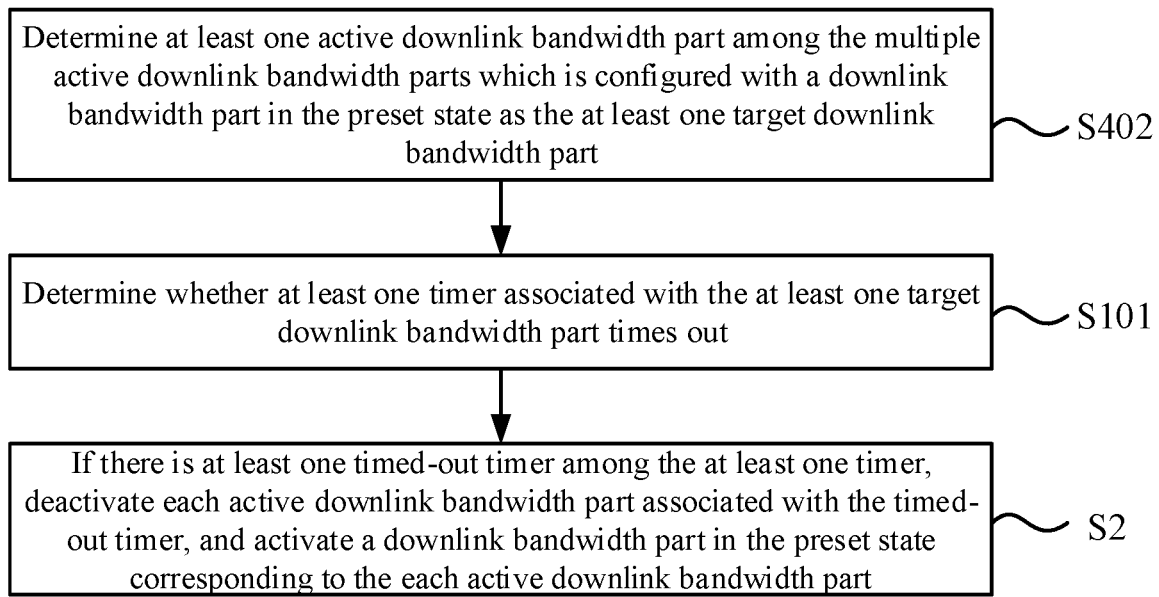
FIG. 7 is a seventh schematic flowchart of a downlink bandwidth part adjustment method according to some other embodiments of the present disclosure.

FIG. 7 is a schematic flowchart of a downlink bandwidth part adjustment method according to some other embodiments of the present disclosure. As shown in FIG. 7, on the basis of the embodiment shown in FIG. 5, determining at least one target downlink bandwidth part among the multiple active downlink bandwidth parts which is configured with a function of automatically falling back to a downlink bandwidth part in a preset state includes the following step:

In step S402, at least one active downlink bandwidth part among the multiple active downlink bandwidth parts which is configured with a downlink bandwidth part in the preset state is determined as the at least one target downlink bandwidth part.

In an embodiment, the base station may configure the downlink bandwidth part in the preset state for the active downlink bandwidth part(s) of the cell. When the user equipment determines that a certain active downlink bandwidth part of the current serving cell is configured with a downlink bandwidth part in the preset state, the user equipment can determine that the active downlink bandwidth part is configured with the above-mentioned function, and accordingly, the active downlink bandwidth part can be used as the target downlink bandwidth part.

According to some embodiments, the preset state includes a default state and/or an initial state.

Figure 8:
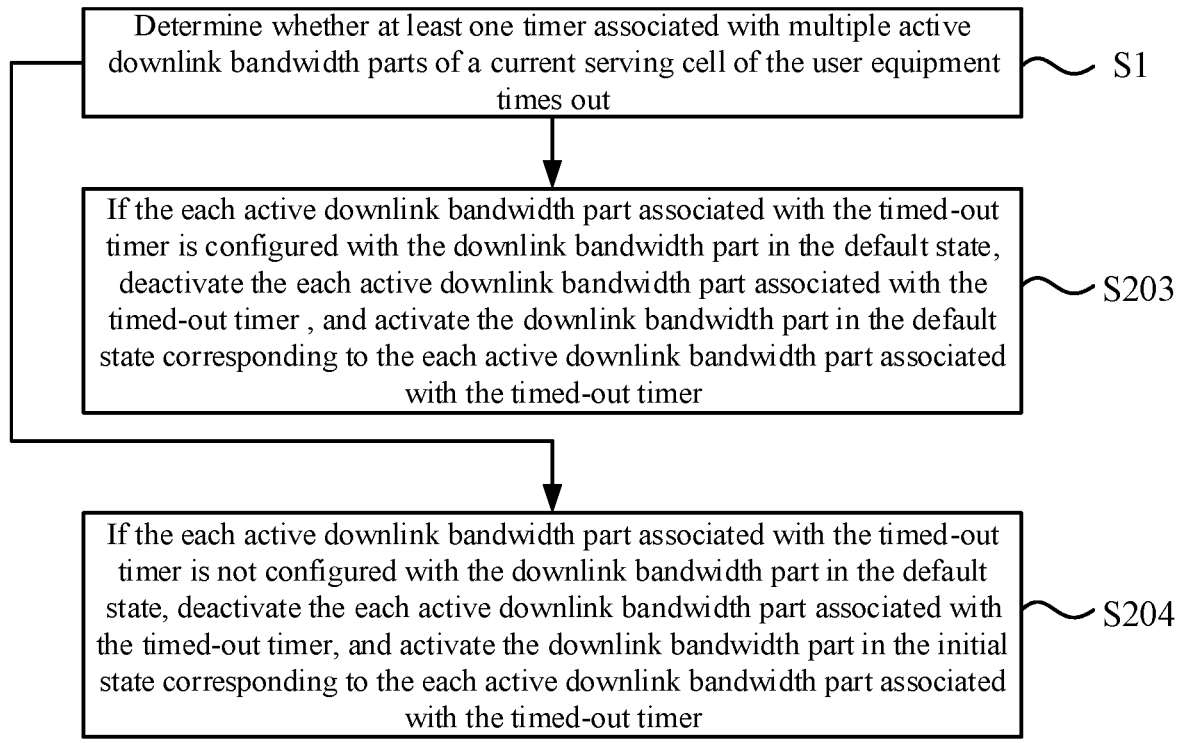
FIG. 8 is an eighth schematic flowchart of a downlink bandwidth part adjustment method according to some other embodiments of the present disclosure.

FIG. 8 is a schematic flowchart of a downlink bandwidth part adjustment method according to some other embodiments of the present disclosure. As shown in FIG. 8, on the basis of the embodiment shown in FIG. 1, deactivating each active downlink bandwidth part associated with the timed-out timer, and activating a downlink bandwidth part in a preset state corresponding to the each active downlink bandwidth part includes the following steps:

In step S203, if the each active downlink bandwidth part associated with the timed-out timer is configured with the downlink bandwidth part in the default state, the each active downlink bandwidth part associated with the timed-out timer is deactivated, and the downlink bandwidth part in the default state corresponding to the each active downlink bandwidth part associated with the timed-out timer is activated.

In step S204, if the each active downlink bandwidth part associated with the timed-out timer is not configured with the downlink bandwidth part in the default state, the each active downlink bandwidth part associated with the timed-out timer is deactivated, and the downlink bandwidth part in the initial state corresponding to the each active downlink bandwidth part associated with the timed-out timer is activated.

In an embodiment, a downlink bandwidth part in the initial state is applicable to all user equipment, while a downlink bandwidth part in the default state is only applicable to some user equipment. As compared with the downlink bandwidth part in the default state, more user equipment uses the downlink bandwidth part in the initial state, and thus congestion is more serious. Therefore, for the active downlink bandwidth part(s) associated with the timed-out timer, the downlink bandwidth part in the default state can be selected first for activation. When the active downlink bandwidth part(s) associated with the timed-out timer is(are) not configured with the downlink bandwidth part in the default state, the downlink bandwidth part in the initial state is selected for activation, so as to ensure the smoothness of user equipment communication as much as possible.

In an embodiment, for the active downlink bandwidth part(s) associated with the timed-out timer, if the downlink bandwidth part in the default state configured for the active downlink bandwidth part(s) associated with the timed-out timer has been activated, the downlink bandwidth part in the initial state corresponding to the active downlink bandwidth part(s) associated with the timed-out timer can be selected to be activated. This can ensure that after deactivating an active downlink bandwidth part, the user equipment can activate another downlink bandwidth part, thereby ensuring the communication quality of the user equipment to a great extent.

Figure 9:
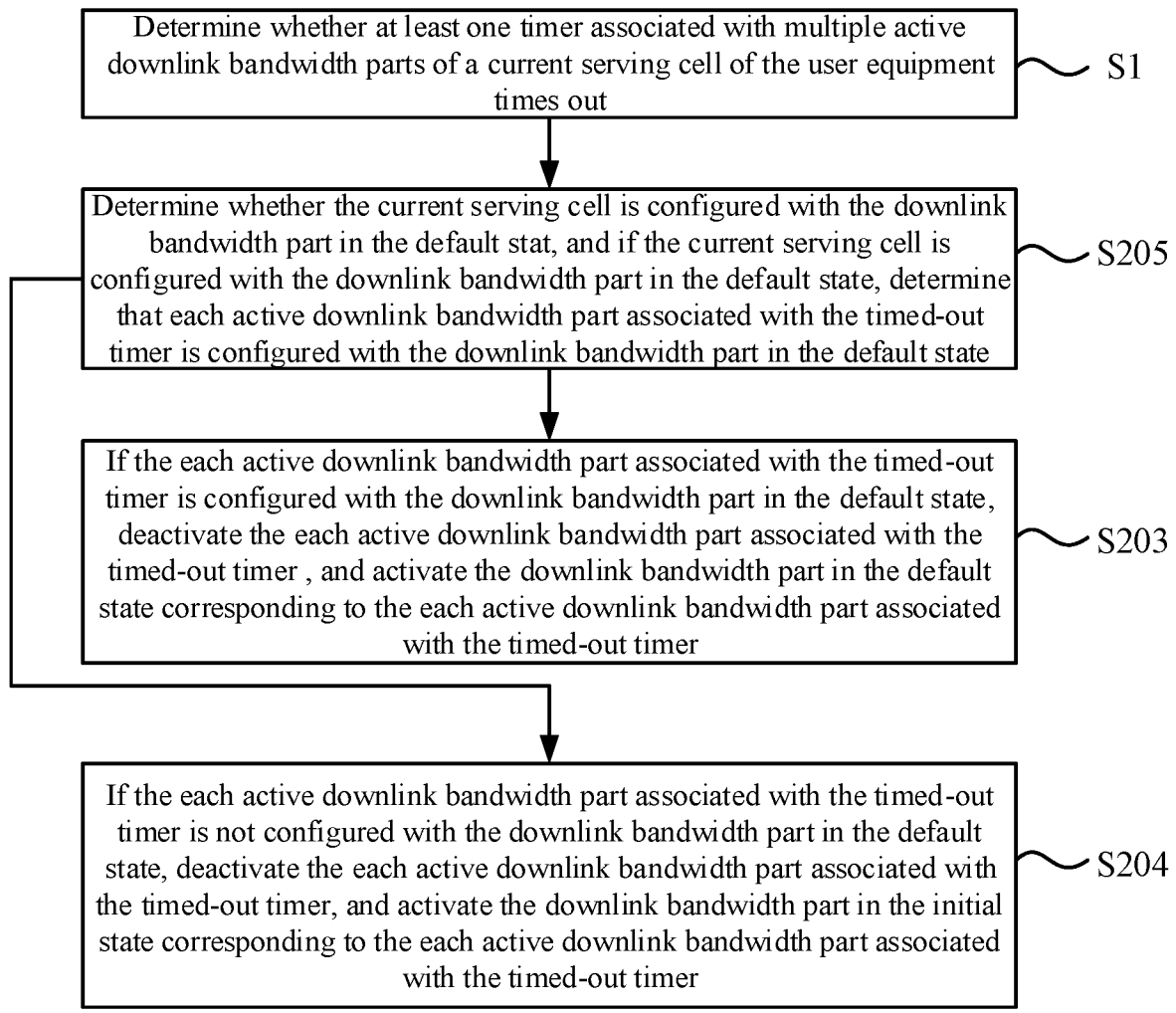
FIG. 9 is a ninth schematic flowchart of a downlink bandwidth part adjustment method according to some other embodiments of the present disclosure.

FIG. 9 is a schematic flowchart of a downlink bandwidth part adjustment method according to some other embodiments of the present disclosure. As shown in FIG. 9, on the basis of the embodiment shown in FIG. 8, deactivating each active downlink bandwidth part associated with the timed-out timer, and activating a downlink bandwidth part in a preset state corresponding to the each active downlink bandwidth part further comprises the following step:

In step S205, whether the current serving cell is configured with the downlink bandwidth part in the default state is determined, and if the current serving cell is configured with the downlink bandwidth part in the default state, it is determined that each active downlink bandwidth part associated with the timed-out timer is configured with the downlink bandwidth part in the default state.

In an embodiment, the base station can configure the downlink bandwidth part in the default state for the cell, and the user equipment can determine whether the current serving cell is configured with the downlink bandwidth part in the default state. For example, the user equipment can query in information received from the base station to determine whether there is a default downlink bandwidth part associated with the identity of the current serving cell; and if there is such default downlink bandwidth part, it is determined that all active downlink bandwidth parts of the current serving cell are configured with the default downlink bandwidth part.

Figure 10:
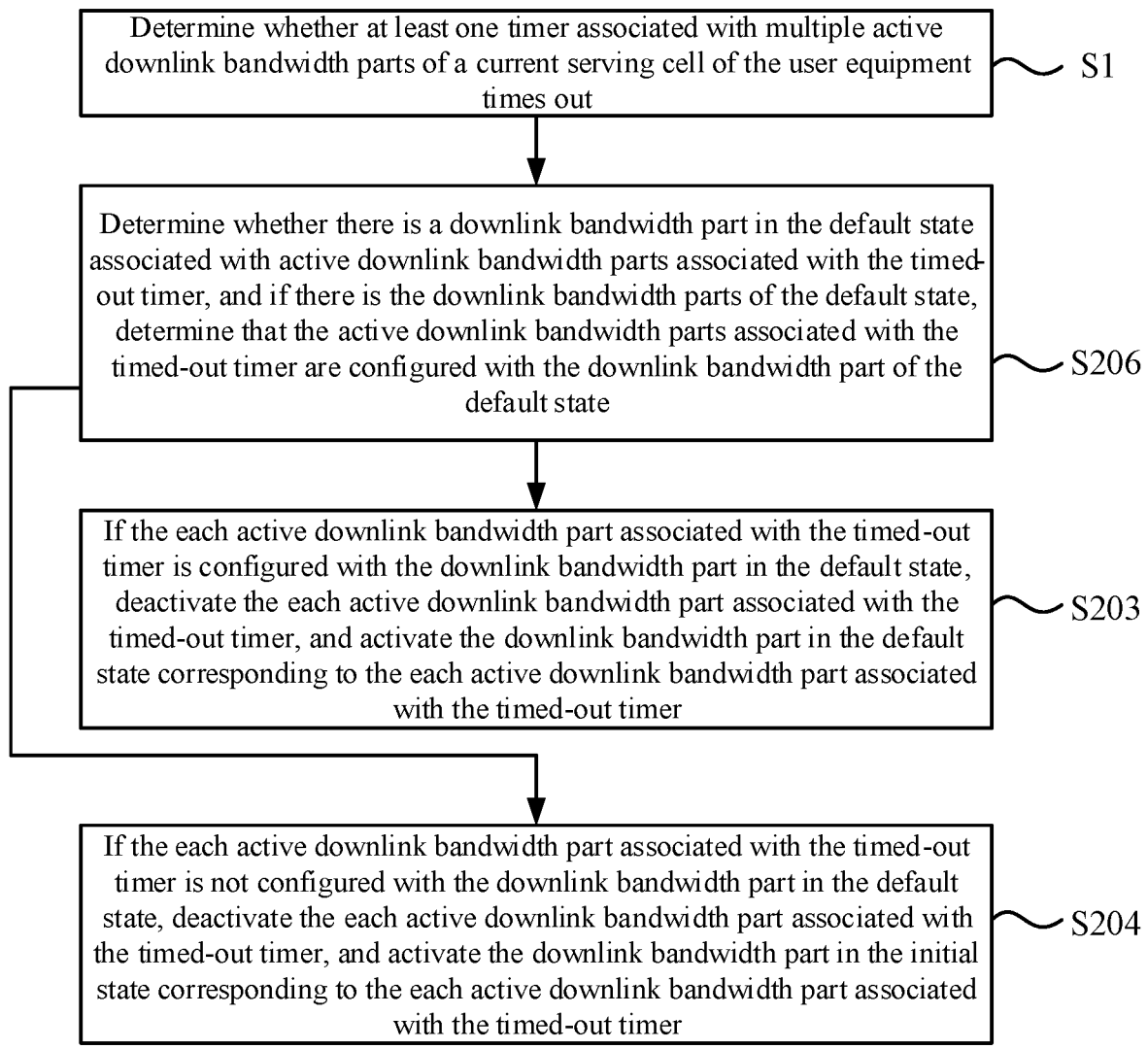
FIG. 10 is a tenth schematic flowchart of a downlink bandwidth part adjustment method according to some other embodiments of the present disclosure.

FIG. 10 is a schematic flowchart of a downlink bandwidth part adjustment method according to some other embodiments of the present disclosure. As shown in FIG. 10, on the basis of the embodiment shown in FIG. 8, making the multiple active downlink bandwidth parts fall back to downlink bandwidth parts in the preset state further includes the following step:

In step S206, whether there is a downlink bandwidth part in the default state associated with active downlink bandwidth parts associated with the timed-out timer is determined, and if there is the downlink bandwidth parts of the default state, it is determined that the active downlink bandwidth parts associated with the timed-out timer are configured with the downlink bandwidth part of the default state.

In an embodiment, the base station can configure the downlink bandwidth part in the default state for the downlink bandwidth parts of the cell, and the user equipment can determine which downlink bandwidth parts of the current serving cell are associated with the downlink bandwidth in the default state according to the information received from the base station. For the active downlink bandwidth parts associated with the downlink bandwidth part in the default state, it can be determined that the active downlink bandwidth parts are configured with the downlink bandwidth part in the default state.

Figure 11:
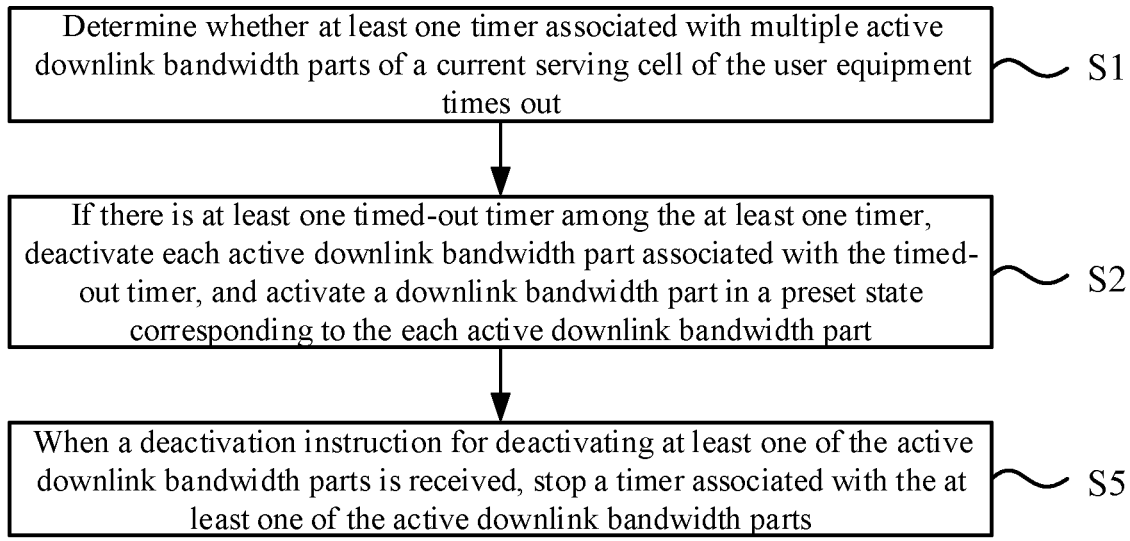
FIG. 11 is an eleventh schematic flowchart of a downlink bandwidth part adjustment method according to some other embodiments of the present disclosure.

FIG. 11 is a schematic flowchart of a downlink bandwidth part adjustment method according to some other embodiments of the present disclosure. As shown in FIG. 11, on the basis of the embodiment shown in FIG. 1, the method further includes the following step:

In step S5, when a deactivation instruction for deactivating at least one of the active downlink bandwidth parts is received, a timer associated with the at least one of the active downlink bandwidth parts is stopped.

In an embodiment, the user equipment may receive a deactivation instruction for deactivating an active downlink bandwidth part. The deactivation instruction may come from the base station or other devices. When the user equipment receives the deactivation instruction, the user equipment can set the active downlink bandwidth part corresponding to the deactivation instruction in an inactive state. The inactive downlink bandwidth part is not active, and thus there is no need to record its inactivity duration by a timer, and accordingly the timer associated with the active downlink bandwidth part may be stopped to reduce the load of the user equipment.

Figure 12:
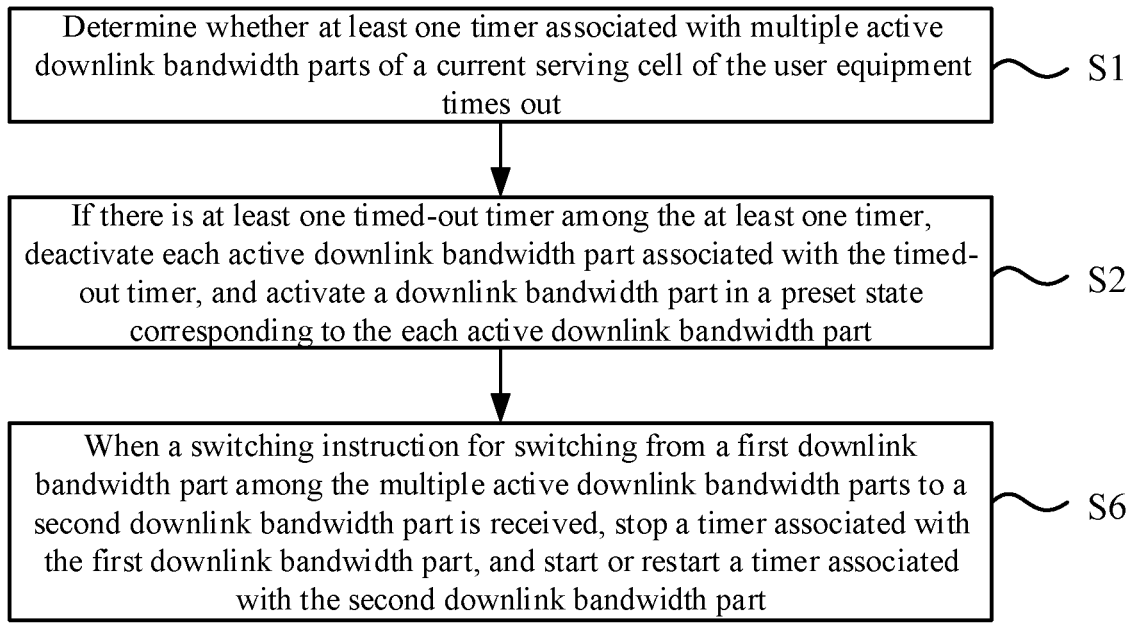
FIG. 12 is a twelfth schematic flowchart of a downlink bandwidth part adjustment method according to some other embodiments of the present disclosure.

FIG. 12 is a schematic flowchart of a downlink bandwidth part adjustment method according to some other embodiments of the present disclosure. As shown in FIG. 12, on the basis of the embodiment shown in FIG. 1, the method further includes the following step:

In step S6, when a switching instruction for switching from a first downlink bandwidth part among the multiple active downlink bandwidth parts to a second downlink bandwidth part is received, a timer associated with the first downlink bandwidth part is stopped, and a timer associated with the second downlink bandwidth part is started or restarted.

In an embodiment, the serving cell of the user equipment is configured with multiple active downlink bandwidth parts. According to the received switching instruction, the user equipment can switch from the first downlink bandwidth part to the second downlink bandwidth part. After the switching, the user equipment does not use the first downlink bandwidth part temporarily, but uses the second downlink bandwidth part to perform communications, and thus the timer associated with the first downlink bandwidth part can be stopped to reduce load the user equipment, and the timer associated with the second downlink bandwidth part can be started or restarted to record the inactivity time period of the second downlink bandwidth part.

Figure 13:
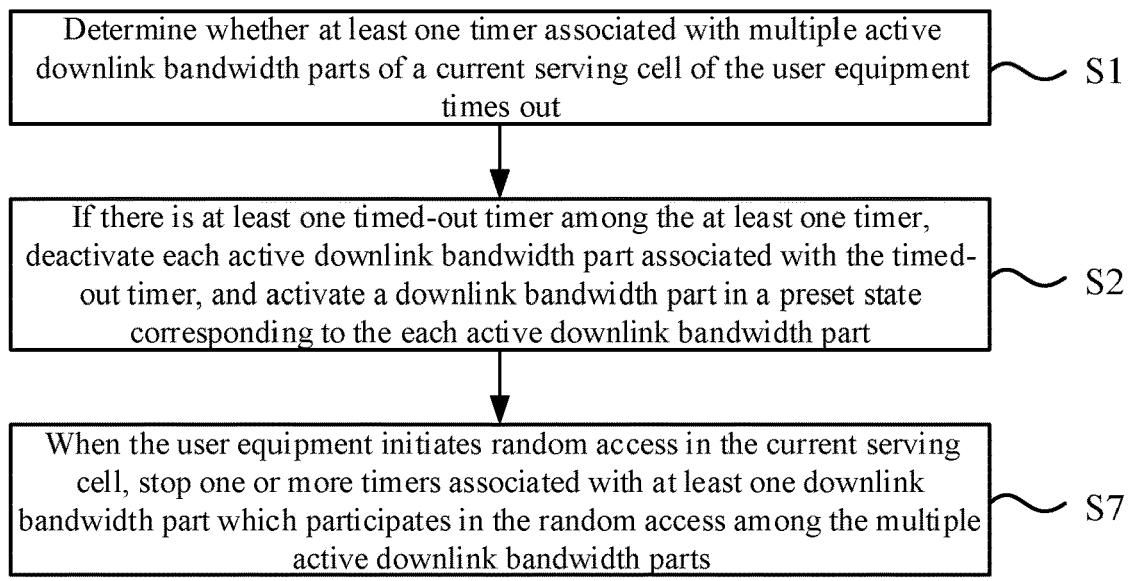
FIG. 13 is a thirteenth schematic flowchart of a downlink bandwidth part adjustment method according to some other embodiments of the present disclosure.

FIG. 13 is a schematic flowchart of a downlink bandwidth part adjustment method according to some other embodiments of the present disclosure. As shown in FIG. 13, on the basis of the embodiment shown in FIG. 1, the method further includes the following step:

In step S7, when the user equipment initiates random access in the current serving cell, one or more timers associated with at least one downlink bandwidth part which participates in the random access among the multiple active downlink bandwidth parts is stopped.

In an embodiment, according to related protocols, when user equipment initiates random access in a serving cell, the user equipment will stop the timer(s) for the active downlink bandwidth part(s) of the serving cell. In this embodiment, there are multiple active downlink bandwidth parts in the current serving cell of the user equipment. When the user equipment initiates random access in the current serving cell, not all the active downlink bandwidth parts may be related to the random access, and thus only one or more timers associated with at least one downlink bandwidth part which participates in the random access among the multiple active downlink bandwidth parts are stopped, and for the downlink bandwidth parts which do not participate in the random access among the multiple active downlink bandwidth parts, the inactivity time period is still recorded by a timer.

In an embodiment, the downlink bandwidth part(s) involved in the random access can be directly determined as the downlink bandwidth part(s) participating in random access, for example, the downlink bandwidth part(s) used by the user equipment to receive the second message (MSG2) in the random access or the fourth message (MSG4) in random access.

In an embodiment, some downlink bandwidth parts that are not involved in the random access still need to be regarded as the downlink bandwidth parts that participate in the random access. For example, there may be the following situations:

When the user equipment adopts the frequency division duplex (FDD) communication mode, the uplink carrier and the downlink carrier can be used as a pair of spectrum, that is, the uplink carrier and the downlink carrier are different carriers, the uplink bandwidth part can correspond to the uplink carrier, and the downlink bandwidth part can correspond to the downlink carrier.

When the user equipment adopts time division duplex (TDD) communication mode, the uplink carrier and the downlink carrier can be used as unpaired spectrum, that is, the uplink carrier and the downlink carrier are the same carrier, and the uplink bandwidth part and the downlink bandwidth part correspond to the same carrier.

When user equipment initiates random access in a non-special cell which refers to a cell other than the primary cell and primary secondary cell in the serving cell, if the uplink bandwidth part used by the user equipment to initiate the random access corresponds to the carrier of the unpaired spectrum, since the downlink carrier and the uplink carrier corresponding to the unpaired spectrum are the same carrier, the downlink bandwidth part corresponding to the unpaired spectrum is determined as the downlink bandwidth part participating in the random access.

When user equipment initiates random access in a non-special cell, if the uplink bandwidth used by the user equipment to initiate the random access corresponds to the carrier of the paired spectrum, since the downlink carrier and the uplink carrier corresponding to the paired spectrum are different carriers but there is still a corresponding relationship between the downlink carrier and the uplink carrier, the downlink bandwidth part corresponding to the paired spectrum can also be determined as the downlink bandwidth part participating in the random access. It should be noted that, in this case, the downlink bandwidth part corresponding to the spectrum may also be determined as the downlink bandwidth part participating in the random access, which can be specifically set as required.

Figure 14:
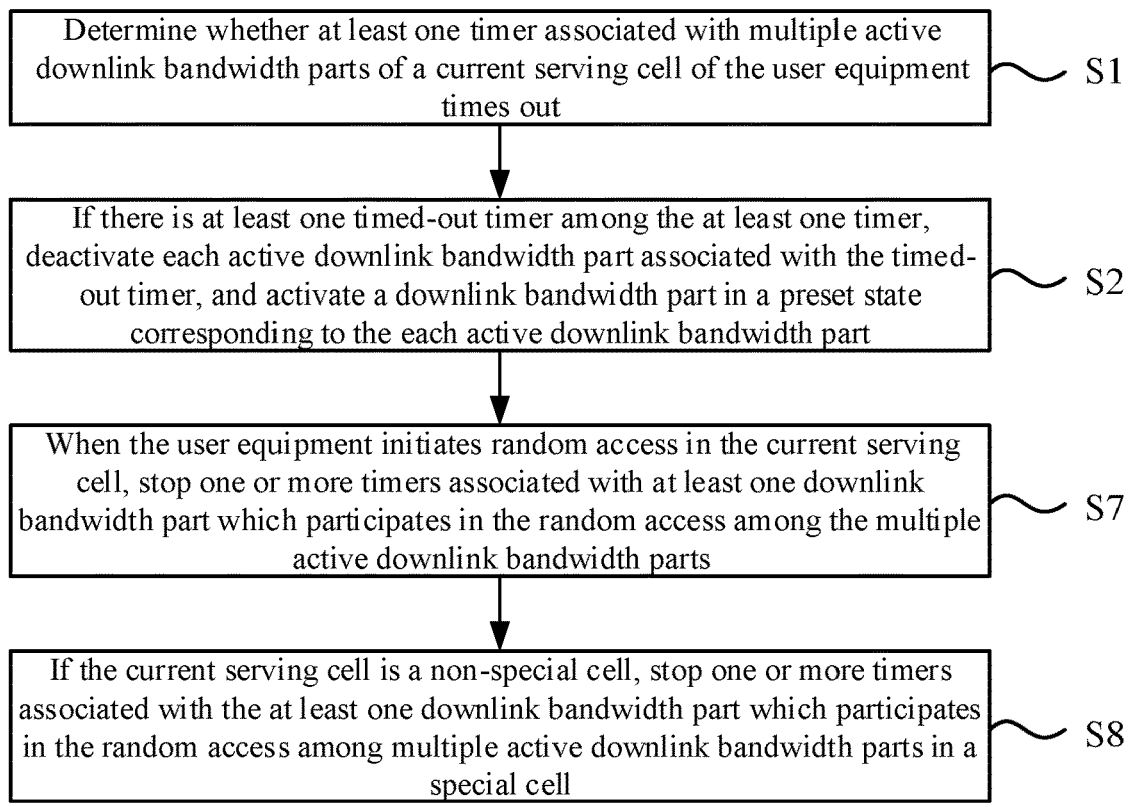
FIG. 14 is a fourteenth schematic flowchart of a downlink bandwidth part adjustment method according to some other embodiments of the present disclosure.

FIG. 14 is a schematic flowchart of a downlink bandwidth part adjustment method according to some other embodiments of the present disclosure. As shown in FIG. 14, on the basis of the embodiment shown in FIG. 13, the method further includes the following step:

In step S8, if the current serving cell is a non-special cell, one or more timers associated with the at least one downlink bandwidth part which participates in the random access among multiple active downlink bandwidth parts in a special cell are stopped.

In an embodiment, if the current serving cell is a non-special cell, that is, when the user equipment initiates random access on the non-special cell, for example, the user equipment sends a random access preamble to the base station in the non-special cell, the user equipment needs to receive the physical downlink control channel (PDCCH) message sent by the base station in the special cell. The physical downlink control channel message may include the second message (MSG2) or the fourth message (MSG4) in the random access. And the user equipment determines, according to the received physical downlink control channel message, whether the initiated random access is successful.

In this procedure, the downlink bandwidth part used to receive the physical downlink control channel message among the active downlink bandwidth parts in the special cell also belongs to the downlink bandwidth part participating in the random access, and thus the timer associated with the downlink bandwidth part can be stopped.

In an embodiment, the user equipment may receive the physical downlink control channel message sent by the base station in a predetermined active downlink bandwidth part, and the predetermined active downlink bandwidth part is the downlink bandwidth part participating in the random access among multiple active downlink bandwidth parts in the special cell. The active downlink bandwidth part can be determined according to the serial number of the active downlink bandwidth part, or according to configuration information from the base station.

In an embodiment, the user equipment may monitor multiple active downlink bandwidth parts to receive the physical downlink control channel message in any one of the multiple active downlink bandwidth parts. The multiple active downlink bandwidth parts are the downlink bandwidth parts participating in the random access among multiple active downlink bandwidth parts in the special cell.

Figure 15:
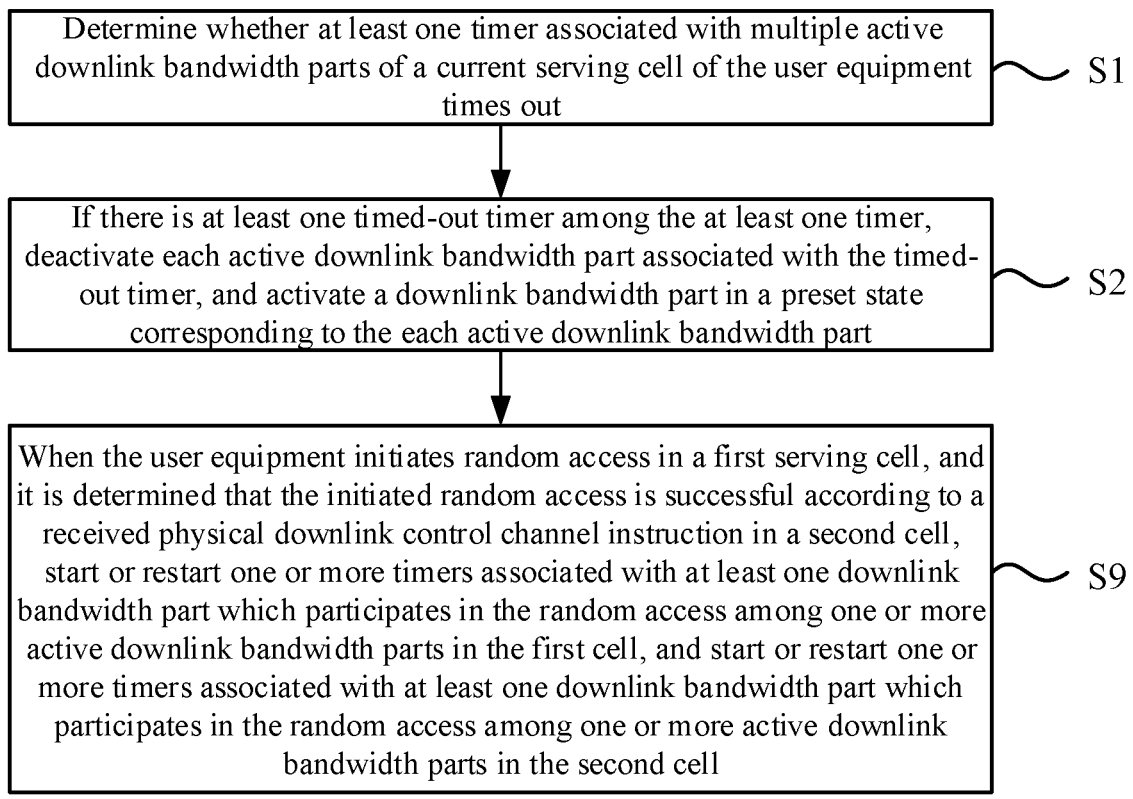
FIG. 15 is a fifteenth schematic flowchart of a downlink bandwidth part adjustment method according to some other embodiments of the present disclosure.

FIG. 15 is a schematic flowchart of a downlink bandwidth part adjustment method according to some other embodiments of the present disclosure. As shown in FIG. 15, on the basis of the embodiment shown in FIG. 1, the method further includes the following step:

In step S9, when the user equipment initiates random access in a first serving cell, and it is determined that the initiated random access is successful according to a received physical downlink control channel instruction in a second cell, one or more timers associated with at least one downlink bandwidth part which participates in the random access among one or more active downlink bandwidth parts in the first cell are started or restarted, and one or more timers associated with at least one downlink bandwidth part which participates in the random access among one or more active downlink bandwidth parts in the second cell are started or restarted.

In an embodiment, when the user equipment initiates random access on a certain cell, the user equipment stops the timer for the active downlink bandwidth part(s) in the cell. However, for a certain type of cell, such as a non-special cell, after the user equipment initiates random access on this type of cell, the user equipment needs to receive the physical downlink control channel message sent by the base station in other types of cells, such as primary or primary secondary cells, so as to determine whether the initiated random access is successful.

In this case, the first cell (for example, secondary cell) where the user equipment initiates the random access and the second cell (for example, primary cell or primary secondary cell) where the physical downlink control channel message is received are different. When the user equipment initiates the random access, the user equipment will not only stop the bandwidth part inactivity timer(s) for the active downlink bandwidth part(s) in the first cell, but also stop the bandwidth part inactivity timer(s) for the active downlink bandwidth part(s) in the second cell.

According to some embodiments of the present disclosure, not only the bandwidth part inactivity timer(s) for the active downlink bandwidth part(s) in the first cell can be started or restarted, but also the bandwidth part inactivity timer(s) for the active downlink bandwidth part(s) in the second cell can be started or restarted. Accordingly, the stopped bandwidth part inactivity timer(s) for the active downlink bandwidth parts in the first cell and the second cell can be started or restarted, so as to ensure that the inactivity duration of the active downlink bandwidth parts in the first cell and the inactivity duration of the active downlink bandwidth parts in the second cell can be recorded.

According to some embodiments, the first cell and the second cell are different cells.

According to some embodiments, the first cell and the second cell are the same cell.

The embodiment shown in FIG. 15 may be applicable to the case where the first cell and the second cell are different cells, or may be applicable to the case where the first cell and the second cell are the same cell. In the case that the first cell and the second cell are the same cell, for the same cell, the bandwidth part inactivity timer(s) for the active downlink bandwidth parts only needs to be started or restarted once.

Figure 16:
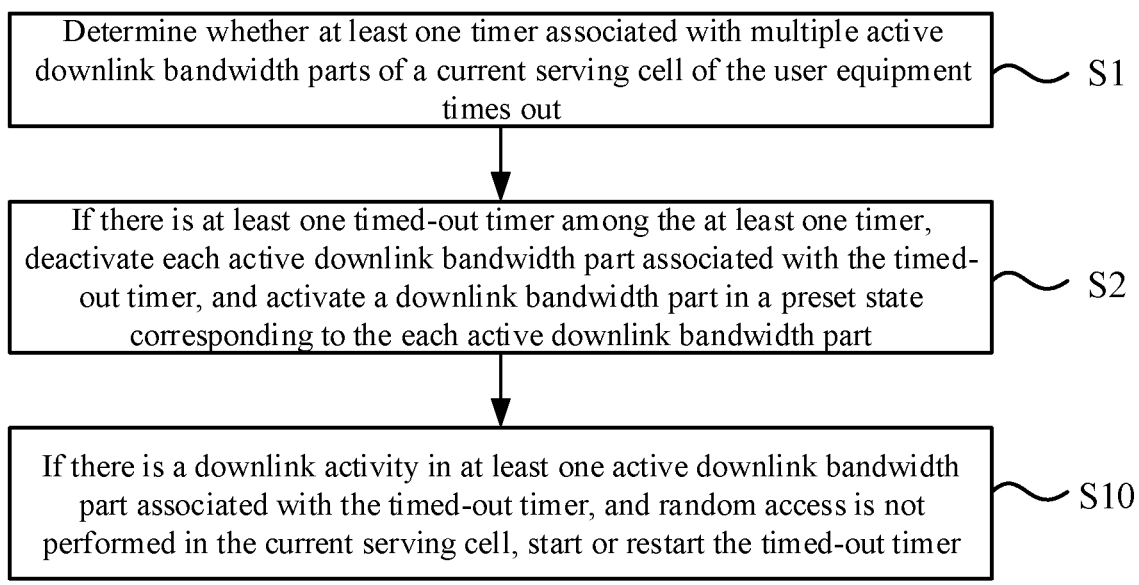
FIG. 16 is a sixteenth schematic flowchart of a downlink bandwidth part adjustment method according to some other embodiments of the present disclosure.

FIG. 16 is a schematic flowchart of a downlink bandwidth part adjustment method according to some other embodiments of the present disclosure. As shown in FIG. 16, on the basis of the embodiment shown in FIG. 1, the method further includes the following step:

In step S10, if there is a downlink activity in at least one active downlink bandwidth part associated with the timed-out timer, and random access is not performed in the current serving cell, the timed-out timer is started or restarted.

In an embodiment, if there is a downlink activity in at least one active downlink bandwidth part associated with the timed-out timer, and random access is not performed in the current serving cell, it means that the active downlink bandwidth part associated with the timed-out timer has been activated and is not occupied by the random access procedure, and thus the timed-out timer can be started or restarted to record the inactivity duration of the active downlink bandwidth part.

In an embodiment, the downlink activity may refer to receiving a physical downlink control channel message. The physical downlink control channel message includes an uplink grant message (UL grant) or a downlink assignment message (DL assignment). The downlink assignment message can be a certain active downlink bandwidth part for the current serving cell. The downlink activity can also refer to receiving a Media Access Control Protocol Data Unit (MAC PDU). Of course, the downlink activity is not limited to the above-mentioned types, and the specific downlink activity can be determined depending on actual situations.

Figure 17:
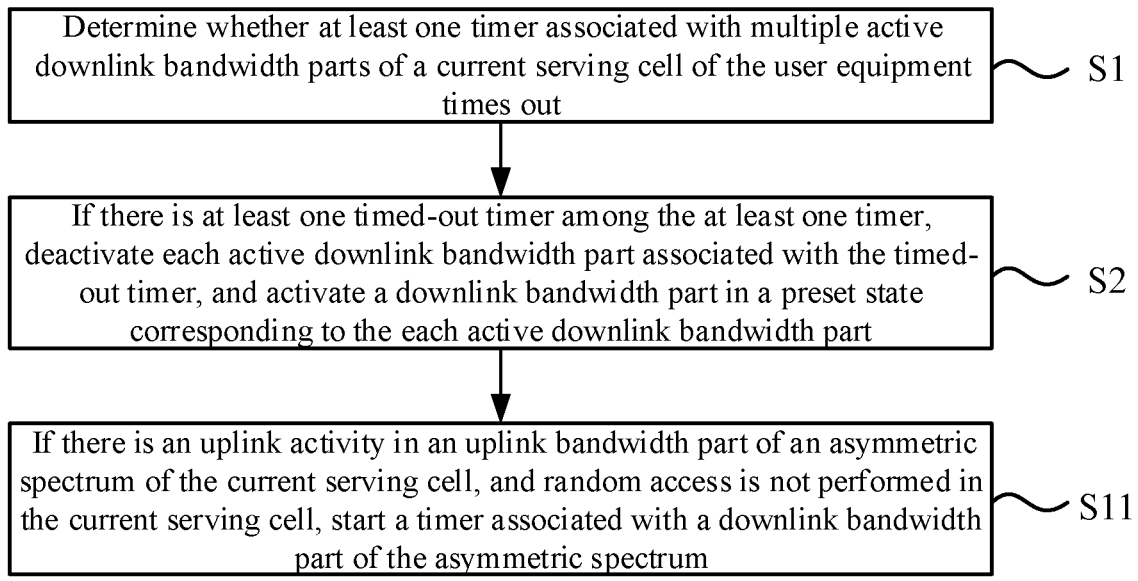
FIG. 17 is a seventeenth schematic flowchart of a downlink bandwidth part adjustment method according to some other embodiments of the present disclosure.

FIG. 17 is a schematic flowchart of a downlink bandwidth part adjustment method according to some other embodiments of the present disclosure. As shown in FIG. 17, on the basis of the embodiment shown in FIG. 1, the method further includes the following step:

In step S11, if there is an uplink activity in an uplink bandwidth part of an asymmetric spectrum of the current serving cell, and random access is not performed in the current serving cell, a timer associated with a downlink bandwidth part of the asymmetric spectrum is started.

In an embodiment, for an asymmetric spectrum, the uplink bandwidth part and the downlink bandwidth part correspond to the same carrier, that is, the uplink bandwidth part and the downlink bandwidth part are the same. If there is an uplink activity in the uplink bandwidth part of the asymmetric spectrum of the current serving cell, the downlink bandwidth part of the asymmetric spectrum is also active, and if the uplink bandwidth part is not occupied by the random access procedure, the timed-out timer can be started or restarted to record the inactivity duration of the active downlink bandwidth part.

In an embodiment, the uplink activity may be that the user equipment receives an uplink grant message for the uplink bandwidth part, or that the user equipment receives the media access control protocol data unit by the uplink bandwidth part. Of course, the uplink activity is not limited to the above-mentioned types, and the specific uplink activity can be determined depending on actual situations.

Figure 18:
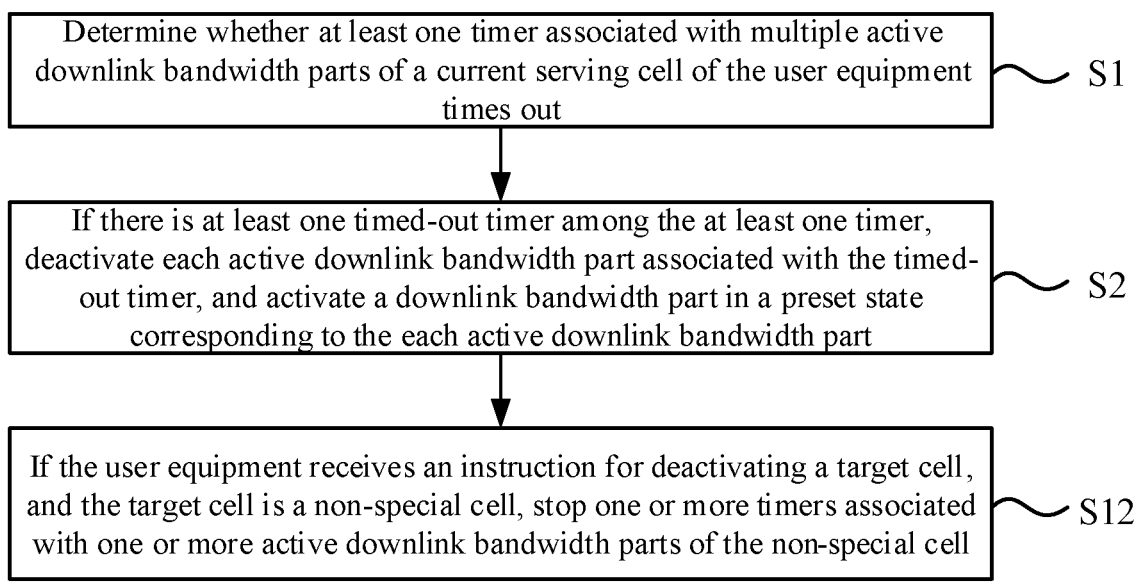
FIG. 18 is an eighteenth schematic flowchart of a downlink bandwidth part adjustment method according to some other embodiments of the present disclosure.

FIG. 18 is a schematic flowchart of a downlink bandwidth part adjustment method according to some other embodiments of the present disclosure. As shown in FIG. 18, on the basis of the embodiment shown in FIG. 1, the method further includes the following step:

In step S12, if the user equipment receives an instruction for deactivating a target cell, and the target cell is a non-special cell, one or more timers associated with one or more active downlink bandwidth parts of the non-special cell are stopped.

In an embodiment, the base station may send an instruction to the user equipment to deactivate the target cell in the serving cell of the user equipment. If the target cell is a non-special cell, then all active downlink bandwidth parts of the target cell will also be deactivated, so that for all the downlink bandwidth parts of the target cell, the user equipment can stop their inactivity durations. Accordingly, one or more timers associated with one or more active downlink bandwidth parts in the non-special cell can be stopped.

Corresponding to the foregoing embodiments of the downlink bandwidth part adjustment methods, the present disclosure also provides embodiments of downlink bandwidth part adjustment devices.

Figure 19:
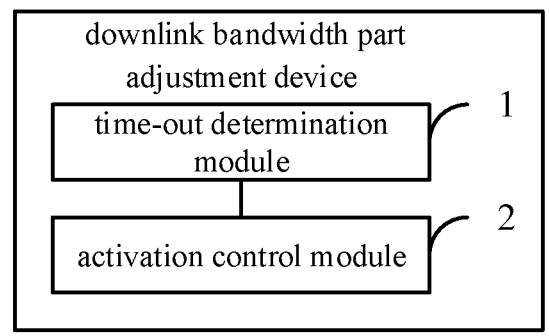
FIG. 19 is a first schematic block diagram of a downlink bandwidth part adjustment device according to some other embodiments of the present disclosure.

FIG. 19 is a schematic block diagram of a downlink bandwidth part adjustment device according to some other embodiments of the present disclosure. The downlink bandwidth part adjustment device in this embodiment may be applicable to user equipment, such as electronic equipment like mobile phone or tablet computer. The user equipment may communicate with a base station, and the base station may be, for example, a 4G base station, a 5G base station, or the like.

As shown in FIG. 19, the downlink bandwidth part adjustment device may include a time-out determination module 1, and an activation control module 2.

The time-out determination module is configured to determine whether at least one timer associated with multiple active downlink bandwidth parts of a current serving cell of the user equipment times out.

The activation control module 2 is configured to, if there is at least one timed-out timer among the at least one timer, deactivate each active downlink bandwidth part associated with the timed-out timer, and activate a downlink bandwidth part in a preset state corresponding to the each active downlink bandwidth part.

According to some embodiments, the activation control module is configured to:

if the each active downlink bandwidth part associated with the timed-out timer is not the downlink bandwidth part in the preset state, and the downlink bandwidth part in the preset state has been activated, deactivate the each active downlink bandwidth part associated with the timed-out timer.

Figure 20:
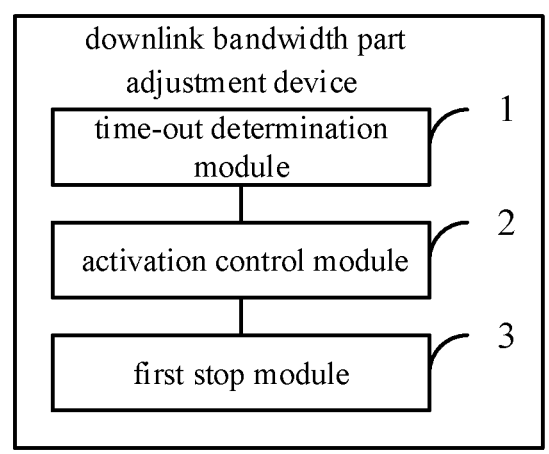
FIG. 20 is a second schematic block diagram of a downlink bandwidth part adjustment device according to some other embodiments of the present disclosure.

FIG. 20 is a schematic block diagram of a downlink bandwidth part adjustment device according to some other embodiments of the present disclosure. As shown in FIG. 20, on the basis of the embodiment as shown in FIG. 19, the device further includes:

a first stop module 3 configured to stop the timed-out timer.

According to some embodiments, the activation control module is configured to:

if there are multiple active downlink bandwidth parts associated with the timed-out timer, and the multiple active downlink bandwidth parts correspond to a same downlink bandwidth part in the preset state, deactivate the multiple active downlink bandwidth parts, and activating the downlink bandwidth part in the preset state corresponding to the multiple active downlink bandwidth parts.

Figure 21:
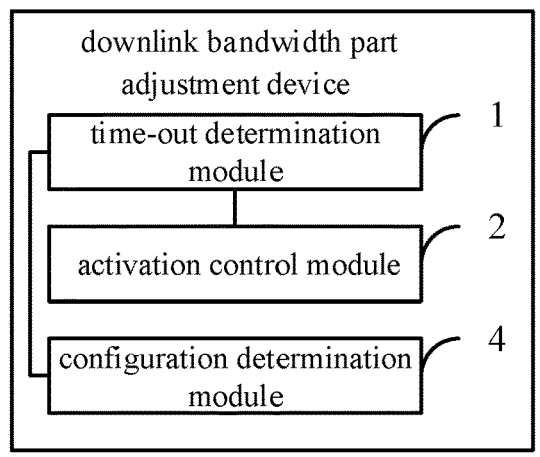
FIG. 21 is a third schematic block diagram of a downlink bandwidth part adjustment device according to some other embodiments of the present disclosure.

FIG. 21 is a schematic block diagram of a downlink bandwidth part adjustment device according to some other embodiments of the present disclosure. As shown in FIG. 21, on the basis of the embodiment shown in FIG. 19, the device further includes:

a configuration determination module 4 configured to, before whether at least one timer associated with multiple active downlink bandwidth parts of a current serving cell of the user equipment times out is determined, determine at least one target downlink bandwidth part among the multiple active downlink bandwidth parts which is configured with a function of automatically falling back to a downlink bandwidth part in a preset state;

the time-out determination module 1 is configured to:

determine whether at least one timer associated with the at least one target downlink bandwidth part times out.

According to some embodiments, the configuration determination module is configured to:

determine whether the current serving cell is configured with the at least one timer, and if the current serving cell is configured with the at least one timer, determining each of the multiple active downlink bandwidth parts as the target downlink bandwidth part.

According to some embodiments, the configuration determination module is configured to:

determine at least one active downlink bandwidth part among the multiple active downlink bandwidth parts which is configured with a downlink bandwidth part in the preset state as the at least one target downlink bandwidth part.

According to some embodiments, the preset state includes a default state and/or an initial state.

Figure 22:
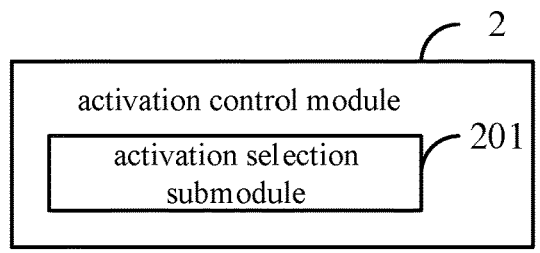
FIG. 22 is a fourth schematic block diagram showing an activation control module according to some other embodiments of the present disclosure.

FIG. 22 is a schematic block diagram showing an activation control module according to some other embodiments of the present disclosure. As shown in FIG. 22, the activation control module 2 includes:

an activation selection submodule 201 configured to, if the each active downlink bandwidth part associated with the timed-out timer is configured with the downlink bandwidth part in the default state, deactivate the each active downlink bandwidth part associated with the timed-out timer, and activate the downlink bandwidth part in the default state corresponding to the each active downlink bandwidth part associated with the timed-out timer; and if the each active downlink bandwidth part associated with the timed-out timer is not configured with the downlink bandwidth part in the default state, deactivate the each active downlink bandwidth part associated with the timed-out timer, and activate the downlink bandwidth part in the initial state corresponding to the each active downlink bandwidth part associated with the timed-out timer.

Figure 23:
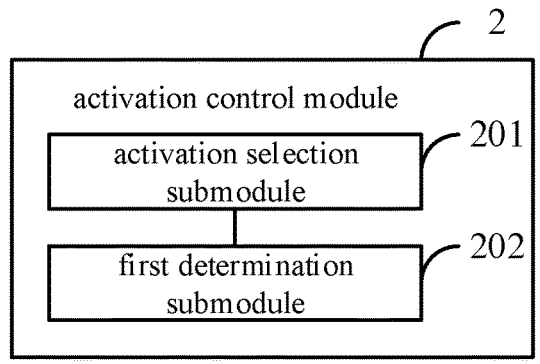
FIG. 23 is a fifth schematic block diagram showing an activation control module according to some other embodiments of the present disclosure.

FIG. 23 is a schematic block diagram showing an activation control module according to some other embodiments of the present disclosure. As shown in FIG. 23, the activation control module 2 further includes:

a first determination submodule 202 configured to determine whether the current serving cell is configured with the downlink bandwidth part in the default state, and if the current serving cell is configured with the downlink bandwidth part in the default state, determine that each active downlink bandwidth part associated with the timed-out timer is configured with the downlink bandwidth part in the default state.

Figure 24:
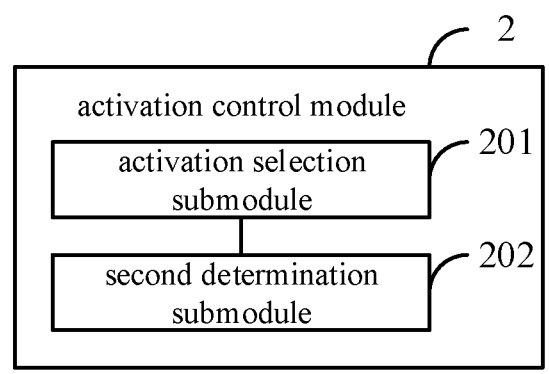
FIG. 24 is a sixth schematic block diagram showing an activation control module according to some other embodiments of the present disclosure.

FIG. 24 is a schematic block diagram showing an activation control module according to some other embodiments of the present disclosure. As shown in FIG. 24, the activation control module 2 further includes:

a second determination submodule 203 configured to determine whether there is a downlink bandwidth part in the default state associated with active downlink bandwidth parts associated with the timed-out timer, and if there is the downlink bandwidth part in the default state, determine that the active downlink bandwidth parts associated with the timed-out timer are configured with the downlink bandwidth part in the default state.

Figure 25:
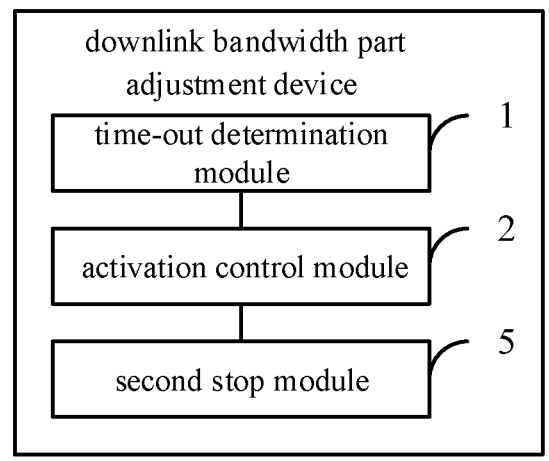
FIG. 25 is a seventh schematic block diagram of a downlink bandwidth part adjustment device according to some other embodiments of the present disclosure.

FIG. 25 is a schematic block diagram of a downlink bandwidth part adjustment device according to some other embodiments of the present disclosure. As shown in FIG. 25, on the basis of the embodiment show in FIG. 19, the device further includes:

a second stop module 5 configured to, when a deactivation instruction for deactivating at least one of the active downlink bandwidth parts is received, stop a timer associated with the at least one of the active downlink bandwidth parts.

Figure 26:
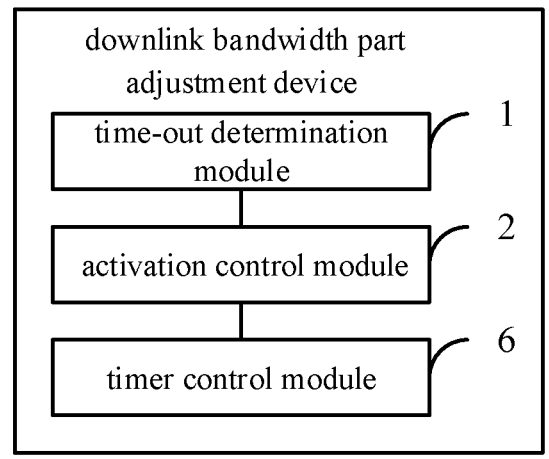
FIG. 26 is an eighth schematic block diagram of a downlink bandwidth part adjustment device according to some other embodiments of the present disclosure.

FIG. 26 is a schematic block diagram of a downlink bandwidth part adjustment device according to some other embodiments of the present disclosure. As shown in FIG. 26, on the basis of the embodiment shown in FIG. 19, the device further includes:

a timer control module 6 configured to, when a switching instruction for switching from a first downlink bandwidth part among the multiple active downlink bandwidth parts to a second downlink bandwidth part is received, stop a timer associated with the first downlink bandwidth part, and start or restart a timer associated with the second downlink bandwidth part.

Figure 27:
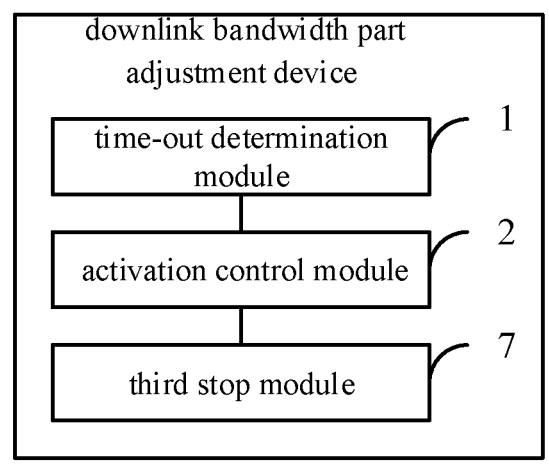
FIG. 27 is a ninth schematic block diagram of a downlink bandwidth part adjustment device according to some other embodiments of the present disclosure.

FIG. 27 is a schematic block diagram of a downlink bandwidth part adjustment device according to some other embodiments of the present disclosure. As shown in FIG. 27, on the basis of the embodiment shown in FIG. 19, the device further includes:

a third stop module 7 configured to, when the user equipment initiates random access in the current serving cell, stop one or more timers associated with at least one downlink bandwidth part which participates in the random access among the multiple active downlink bandwidth parts.

According to some embodiments, the third stop module is further configured to:

if the current serving cell is a non-special cell, stop one or more timers associated with the at least one downlink bandwidth part which participates in the random access among multiple active downlink bandwidth parts in a special cell.

Figure 28:
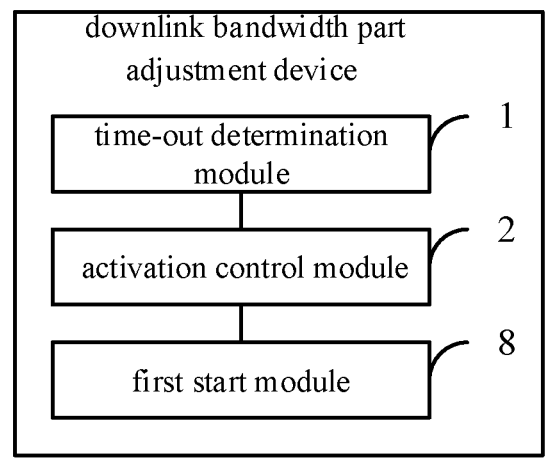
FIG. 28 is a tenth schematic block diagram of a downlink bandwidth part adjustment device according to some other embodiments of the present disclosure.

FIG. 28 is a schematic block diagram of a downlink bandwidth part adjustment device according to some other embodiments of the present disclosure. As shown in FIG. 28, on the basis of the embodiment shown in FIG. 19, the device further includes:

a first start module 8 configured to, when the user equipment initiates random access in a first serving cell, and it is determined that the initiated random access is successful according to a received physical downlink control channel instruction in a second cell, start or restart one or more timers associated with at least one downlink bandwidth part which participates in the random access among one or more active downlink bandwidth parts in the first cell, and start or restart one or more timers associated with at least one downlink bandwidth part which participates in the random access among one or more active downlink bandwidth parts in the second cell.

According to some embodiments, the first cell and the second cell are different cells.

According to some embodiments, the first cell and the second cell are a same cell.

Figure 29:
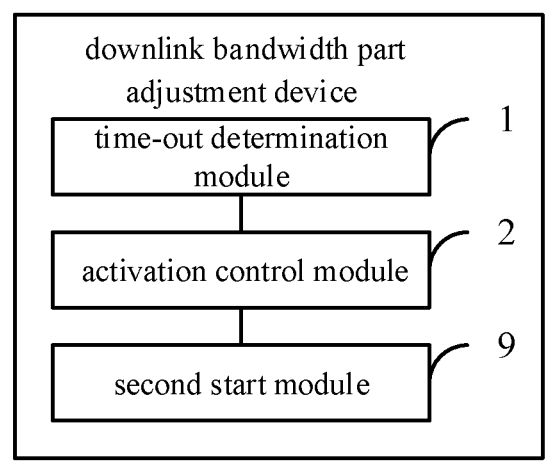
FIG. 29 is an eleventh schematic block diagram of a downlink bandwidth part adjustment device according to some other embodiments of the present disclosure.

FIG. 29 is a schematic block diagram of a downlink bandwidth part adjustment device according to some other embodiments of the present disclosure. As shown in FIG. 29, on the basis of the embodiment shown in FIG. 19, the device further includes:

a second start module 9 configured to, if there is a downlink activity in at least one active downlink bandwidth part associated with the timed-out timer, and random access is not performed in the current serving cell, start or restart the timed-out timer.

Figure 30:
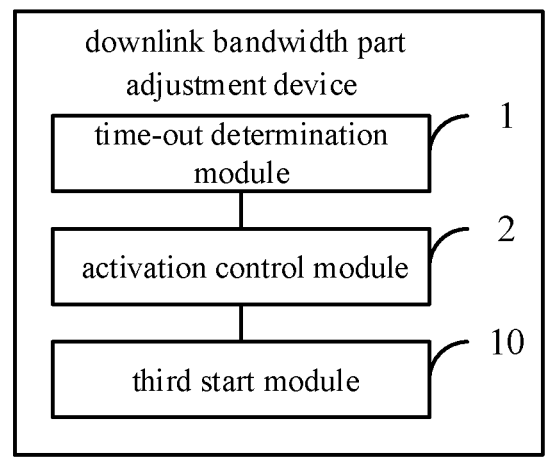
FIG. 30 is a twelfth schematic block diagram of a downlink bandwidth part adjustment device according to some other embodiments of the present disclosure.

FIG. 30 is a schematic block diagram of a downlink bandwidth part adjustment device according to some other embodiments of the present disclosure. As shown in FIG. 30, on the basis of the embodiment shown in FIG. 19, the device further includes:

a third start module 10 configured to, if there is an uplink activity in an uplink bandwidth part of an asymmetric spectrum of the current serving cell, and random access is not performed in the current serving cell, start a timer associated with a downlink bandwidth part of the asymmetric spectrum.

Figure 31:
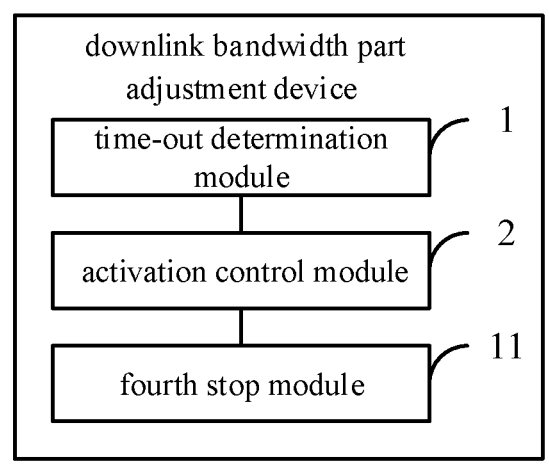
FIG. 31 is a thirteenth schematic block diagram of a downlink bandwidth part adjustment device according to some other embodiments of the present disclosure.

FIG. 31 is a schematic block diagram of a downlink bandwidth part adjustment device according to some other embodiments of the present disclosure. As shown in FIG. 31, on the basis of the embodiment shown in FIG. 19, the device further includes:

a fourth stop module 11 configured to, if the user equipment receives an instruction for deactivating a target cell, and the target cell is a non-special cell, stop one or more timers associated with one or more active downlink bandwidth parts of the non-special cell.

With respect to the devices in the above embodiments, the specific manners for performing operations for individual units therein have been described in detail in the embodiments regarding the method embodiments, which will not be elaborated herein.

The embodiments of devices basically correspond to the embodiments of methods, and thus for related portions, the description about the embodiments of methods may be referred to. The above described embodiments of devices are only illustrative, and portions described as separated units may be or may not be physically separated, and the portions shown as respective units may be or may not be physical modules, i.e., the portions may be located at one place, or may be distributed over a plurality of network units. A part or whole of the modules may be selected to realize the objectives of the technical solutions of the present disclosure according to actual requirements. One of ordinary skill in this art may understand and practice the technical solutions of the present disclosure without creative work.

An embodiment of the present disclosure provides an electronic device, including:

a processor; and a memory for storing instructions executable by the processor;

the processor is configured to perform the method according to any one of the above embodiments.

An embodiment of the present disclosure further provides a computer-readable storage medium having computer programs stored thereon. When the computer programs are executed by a processor, the processor is caused to perform the steps of the method according any one of the above embodiments.

Figure 32:
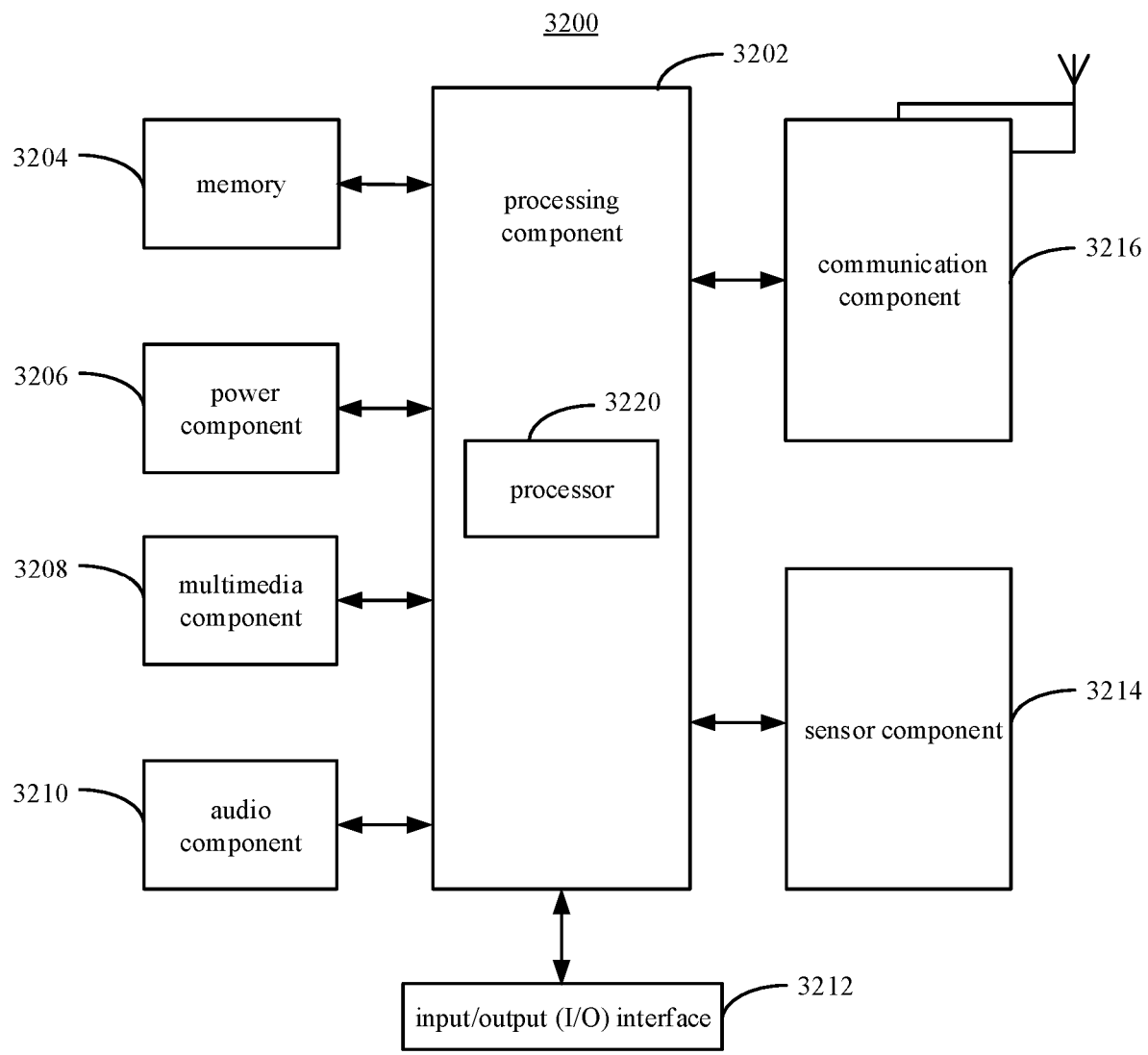
FIG. 32 is a fourteenth schematic block diagram of a device for adjusting a downlink bandwidth part according to some other embodiments of the present disclosure.

FIG. 32 is block diagram showing a device 3200 for downlink bandwidth part adjustment according to an exemplary embodiment of the present disclosure. For example, the device 3200 may be a mobile phone, a computer, a digital broadcast terminal, a messaging device, a gaming console, a tablet, a medical device, exercise equipment, a personal digital assistant, and the like Referring to FIG. 32, the device 3200 may include one or more of the following components: a processing component 3202, a memory 3204, a power component 3206, a multimedia component 3208, an audio component 3210, an input/output (I/O) interface 3212, a sensor component 3214, and a communication component 3216.

The processing component 3202 typically controls overall operations of the device 1000, such as the operations associated with display, telephone calls, data communications, camera operations, and recording operations. The processing component 3202 may include one or more processors 3220 to execute instructions to perform all or part of the steps in the above described methods. Moreover, the processing component 3202 may include one or more modules which facilitate the interaction between the processing component 3202 and other components. For instance, the processing component 3202 may include a multimedia module to facilitate the interaction between the multimedia component 3208 and the processing component 3202.

The memory 3204 is configured to store various types of data to support the operation of the device 3200. Examples of such data include instructions for any applications or methods operated on the device 3200, contact data, phonebook data, messages, pictures, video, etc. The memory 3204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3206 provides power to various components of the device 3200. The power component 3206 may include a power management system, one or more power sources, and any other components associated with the generation, management, and distribution of power in the device 3200.

The multimedia component 3208 includes a screen providing an output interface between the electronic device 3200 and the user. In some embodiments, the screen may include a liquid crystal display (LCD) and a touch panel (TP). In some embodiments, and organic light-emitting diode (OLED) can be adopted.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3208 includes a front camera and/or a rear camera. The front camera and the rear camera may receive an external multimedia datum while the device 3200 is in an operation mode, such as a photographing mode or a video mode. Each of the front camera and the rear camera may be a fixed optical lens system or have focus and optical zoom capability.

The audio component 3210 is configured to output and/or input audio signals. For example, the audio component 3210 includes a microphone ("MIC") configured to receive an external audio signal when the device 3200 is in an operation mode, such as a call mode, a recording mode, and a voice recognition mode. The received audio signal may be further stored in the memory 3204 or transmitted via the communication component 3216. The audio 3210 may further include a speaker to output audio signals.

The I/O interface 3212 provides an interface between the processing component 3202 and peripheral interface modules, such as a keyboard, a click wheel, buttons, and the like. The buttons may include, but are not limited to, a home button, a volume button, a starting button, and a locking button.

The sensor component 3214 includes one or more sensors to provide status assessments of various aspects of the device 3200. For instance, the sensor component 3214 may detect an open/closed status of the device 3200, relative positioning of components, e.g., the display and the keypad, of the device 3200, a change in position of the device 3200 or a component of the device 3200, a presence or absence of user contact with the device 3200, an orientation or an acceleration/deceleration of the device 3200, and a change in temperature of the device 3200. The sensor component 3214 may include a proximity sensor configured to detect the presence of nearby objects without any physical contact. The sensor component 3214 may also include a light sensor, such as a CMOS or CCD image sensor, for use in imaging applications. In some embodiments, the sensor component 3214 may also include an accelerometer sensor, a gyroscope sensor, a magnetic sensor, a pressure sensor, or a temperature sensor.

The communication component 3216 is configured to facilitate communication, wired or wirelessly, between the device 3200 and other devices. The device 3200 can access a wireless network based on a communication standard, such as Wi-Fi, 2G, 3G, 4G, or 5G, or a combination thereof. In one exemplary embodiment, the communication component 3216 receives a broadcast signal or broadcast associated information from an external broadcast management system via a broadcast channel. In one exemplary embodiment, the communication component 3216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 3200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method according to any one of the above embodiments.

In exemplary embodiments, there is also provided a non-transitory computer-readable storage medium including instructions, such as included in the memory 3204, executable by the processor 3220 in the device 3200, for performing the above-described methods. For example, the non-transitory computer-readable storage medium may be a ROM, a RAM, a CD-ROM, a magnetic tape, a floppy disc, an optical data storage device, and the like.

Various embodiments of the present disclosure can have one or more of the following advantages.

Each active downlink bandwidth part is associated with a timer, and thus time can be calculated separately for each active downlink bandwidth part by the timer. For example, the timer can be used to record the inactivity time period of each active downlink bandwidth part. When there is a timer that has timed out, that is, among one or more active downlink bandwidth parts for which the timer is used to record the inactivity time periods, the inactivity time period of at least one active downlink bandwidth part is greater than a preset time period, the active downlink bandwidth part(s) associated with the timed-out timer can be switched back to downlink bandwidth part(s) in a preset state. That is, the active downlink bandwidth part(s) associated with the timed-out timer is(are) deactivated, and the downlink bandwidth part(s) in the preset state corresponding to the active downlink bandwidth part(s) associated with the timed-out timer is(are) activated.

Accordingly, multiple active downlink bandwidth parts can be configured for a serving cell, ensuring that the serving cell can be applied to a wider range of application scenarios. By associating each active downlink bandwidth part with a respective timer, time can be calculated for each active downlink bandwidth part. This can ensure that once an active downlink bandwidth part is inactive for a period longer than a preset time period, it can be determined that the timer runs out, and the active downlink bandwidth part is switched back to a downlink bandwidth part in the preset state. Some embodiments of the present disclosure can avoid the situation that when the active downlink bandwidth part is inactive for a period longer than the preset time period, the timer is not determined as timed-out. Thus, embodiments of the present disclosure can ensure that user equipment can communicate normally by the serving cell configured with multiple active downlink bandwidth parts.

The various device components, circuits, units, blocks, or portions may have modular configurations, or are composed of discrete components, but nonetheless can be referred to as "modules," "components," or "circuits" in general. In other words, the "components," "modules," "blocks," "circuits," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

It may be further understood that terms "first", "second", etc. are used to describe various types of information, but the information should not be limited to these terms. These terms are only used to distinguish the same type of information from each other, and do not indicate a specific order or degree of importance. In fact, expressions such as "first" and "second" may be used interchangeably. For example, without departing from the scope of the present disclosure, first information may also be referred to as second information, and similarly, the second information may also be referred to as the first information.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A downlink bandwidth part adjustment method, wherein the method is applicable to a user equipment and the method comprises:

determining whether at least one timer associated with multiple active downlink bandwidth parts of a current serving cell of the user equipment times out; and in response to that there is at least one timed-out timer among the at least one timer, deactivating each active downlink bandwidth part associated with the timed-out timer, and activating a downlink bandwidth part in a preset state corresponding to the each active downlink bandwidth part, wherein the deactivating each active downlink bandwidth part associated with the timed-out timer, and activating a downlink bandwidth part in a preset state corresponding to the each active downlink bandwidth part comprises:

in response to that there are multiple active downlink bandwidth parts associated with the timed-out timer, and the multiple active downlink bandwidth parts correspond to a same downlink bandwidth part in the preset state, deactivating the multiple active downlink bandwidth parts, and activating the downlink bandwidth part in the preset state corresponding to the multiple active downlink bandwidth parts.

2. The method according to claim 1, wherein the deactivating each active downlink bandwidth part associated with the timed-out timer, and activating a downlink bandwidth part in a preset state corresponding to the each active downlink bandwidth part comprises:

in response to that the each active downlink bandwidth part associated with the timed-out timer is not the downlink bandwidth part in the preset state, and the downlink bandwidth part in the preset state has been activated, deactivating the each active downlink bandwidth part associated with the timed-out timer.

3. The method according to claim 2, further comprising: stopping the timed-out timer.

4. The method according claim 1, further comprising:

prior to the determining whether at least one timer associated with multiple active downlink bandwidth parts of a current serving cell of the user equipment times out, determining at least one target downlink bandwidth part among the multiple active downlink bandwidth parts which is configured with a function of automatically falling back to a downlink bandwidth part in a preset state;

wherein the determining whether at least one timer associated with multiple active downlink bandwidth parts of a current serving cell of the user equipment times out comprises:

determining whether at least one timer associated with the at least one target downlink bandwidth part times out.

5. The method according to claim 4, wherein the determining at least one target downlink bandwidth part among the multiple active downlink bandwidth parts which is configured with a function of automatically falling back to a downlink bandwidth part in a preset state comprises:

determining whether the current serving cell is configured with the at least one timer, and if the current serving cell is configured with the at least one timer, determining each of the multiple active downlink bandwidth parts as the target downlink bandwidth part.

6. The method according to claim 4, wherein the determining at least one target downlink bandwidth part among the multiple active downlink bandwidth parts which is configured with a function of automatically falling back to a downlink bandwidth part in a preset state comprises:

determining at least one active downlink bandwidth part among the multiple active downlink bandwidth parts which is configured with a downlink bandwidth part in the preset state as the at least one target downlink bandwidth part.

7. The method according to claim 6, further comprising allowing the multiple active downlink bandwidth parts to automatically fall back to downlink bandwidth parts in the preset state by:

determining whether there is a downlink bandwidth part in a default state associated with active downlink bandwidth parts associated with the timed-out timer, and if there is the downlink bandwidth part in the default state, determining that the active downlink bandwidth parts associated with the timed-out timer are configured with the downlink bandwidth part in the default state.

8. The method according to claim 1, wherein the preset state comprises a default state and/or an initial state.

9. The method according to claim 8, wherein the deactivating each active downlink bandwidth part associated with the timed-out timer, and activating a downlink bandwidth part in a preset state corresponding to the each active downlink bandwidth part comprises:

in response to that the each active downlink bandwidth part associated with the timed-out timer is configured with the downlink bandwidth part in the default state, deactivating the each active downlink bandwidth part associated with the timed-out timer, and activating the downlink bandwidth part in the default state corresponding to the each active downlink bandwidth part associated with the timed-out timer; and in response to that the each active downlink bandwidth part associated with the timed-out timer is not configured with the downlink bandwidth part in the default state, deactivating the each active downlink bandwidth part associated with the timed-out timer, and activating the downlink bandwidth part in the initial state corresponding to the each active downlink bandwidth part associated with the timed-out timer.

10. The method according to claim 9, wherein the deactivating each active downlink bandwidth part associated with the timed-out timer, and activating a downlink bandwidth part in a preset state corresponding to the each active downlink bandwidth part further comprises:

determining whether the current serving cell is configured with the downlink bandwidth part in the default state, and if the current serving cell is configured with the downlink bandwidth part in the default state, determining that each active downlink bandwidth part associated with the timed-out timer is configured with the downlink bandwidth part in the default state.

11. The method according to claim 1, further comprising:

when receiving a deactivation instruction for deactivating at least one of the active downlink bandwidth parts, stopping a timer associated with the at least one of the active downlink bandwidth parts.

12. The method according to claim 1, further comprising:

when receiving a switching instruction for switching from a first downlink bandwidth part among the multiple active downlink bandwidth parts to a second downlink bandwidth part, stopping a timer associated with the first downlink bandwidth part, and starting or restarting a timer associated with the second downlink bandwidth part.

13. The method according to claim 1, further comprising:
when the user equipment initiates random access in the current serving cell, stopping one or more timers associated with at least one downlink bandwidth part which participates in the initiated random access among the multiple active downlink bandwidth parts; and
in response to that the current serving cell is a non-special cell, stopping one or more timers associated with the at least one downlink bandwidth part which participates in the initiated random access among multiple active downlink bandwidth parts in a special cell.

14. The method according to claim 1, further comprising:
when the user equipment initiates random access in a first serving cell, and it is determined that the initiated random access is successful according to a received physical downlink control channel instruction in a second cell, starting or restarting one or more timers associated with at least one downlink bandwidth part which participates in the initiated random access among one or more active downlink bandwidth parts in the first cell, and starting or restarting one or more timers associated with at least one downlink bandwidth part which participates in the initiated random access among one or more active downlink bandwidth parts in the second cell;
wherein the first cell and the second cell are different cells; or
wherein the first cell and the second cell are a same cell.

15. The method according to claim 1, further comprising:
in response to that there is a downlink activity in at least one active downlink bandwidth part associated with the timed-out timer, and random access is not performed in the current serving cell, starting or restarting the timed-out timer.

16. The method according to claim 1, further comprising:
in response to that there is an uplink activity in an uplink bandwidth part of an asymmetric spectrum of the current serving cell, and random access is not performed in the current serving cell, starting a timer associated with a downlink bandwidth part of the asymmetric spectrum.

17. The method according to claim 1, further comprising:
in response to that the user equipment receives an instruction for deactivating a target cell, and the target cell is a non-special cell, stopping one or more timers associated with one or more active downlink bandwidth parts of the non-special cell.

18. A downlink bandwidth part adjustment device, wherein the device is applicable to a user equipment and the device comprises:
a processor; and
a memory configured to stored instructions executable by the processor;
wherein the processor is configured to:
determine whether at least one timer associated with multiple active downlink bandwidth parts of a current serving cell of the user equipment times out; and
in response to that there is at least one timed-out timer among the at least one timer, deactivate each active downlink bandwidth part associated with the timed-out timer, and activate a downlink bandwidth part in a preset state corresponding to the each active downlink bandwidth part; and
in response to that there are multiple active downlink bandwidth parts associated with the timed-out timer, and the multiple active downlink bandwidth parts correspond to a same downlink bandwidth part in the preset state, deactivate the multiple active downlink bandwidth parts, and activate the downlink bandwidth part in the preset state corresponding to the multiple active downlink bandwidth parts.

19. A communication system comprising the downlink bandwidth part adjustment device according to claim 18, wherein:
each active downlink bandwidth part is associated with a timer to facilitate time being calculated separately for each active downlink bandwidth part by the timer;
the timer is configured to record inactivity time period of the each active downlink bandwidth part, and among a plurality of active downlink bandwidth parts for which the timer is used to record the inactivity time periods, in response to that the inactivity time period of at least one active downlink bandwidth part is greater than a preset time period, the active downlink bandwidth parts associated with the timed-out timer are switched back to downlink bandwidth parts in a preset state to be deactivated; and
the downlink bandwidth parts in the preset state corresponding to the active downlink bandwidth parts associated with the timed-out timer are activated, such that multiple active downlink bandwidth parts are configured for a serving cell, ensuring that the serving cell is applicable to a plurality of different application scenarios, while avoiding a situation that the timer is not determined as timed-out when the active downlink bandwidth part is inactive for a period longer than the preset time period.

* * * * *